US009404041B2

(12) United States Patent
Chiou

(10) Patent No.: US 9,404,041 B2
(45) Date of Patent: Aug. 2, 2016

(54) LIQUID CRYSTAL ALIGNMENT AGENT, LIQUID CRYSTAL ALIGNMENT FILM, AND LIQUID CRYSTAL DISPLAY ELEMENT

(71) Applicant: Chi Mei Corporation, Tainan (TW)

(72) Inventor: Shin-Rong Chiou, Kaohsiung (TW)

(73) Assignee: Chi Mei Corporation, Tainan (TW)

( * ) Notice: Subject to any disclaimer, the term of this patent is extended or adjusted under 35 U.S.C. 154(b) by 0 days.

(21) Appl. No.: 14/731,414

(22) Filed: Jun. 5, 2015

(65) Prior Publication Data

US 2015/0353829 A1 Dec. 10, 2015

(30) Foreign Application Priority Data

Jun. 6, 2014 (TW) ............................ 103119784 A

(51) Int. Cl.

| | |
|---|---|
| ***C08G 73/16*** | (2006.01) |
| ***C09K 19/36*** | (2006.01) |
| ***C09K 19/56*** | (2006.01) |
| ***C08L 79/08*** | (2006.01) |
| ***C08J 5/18*** | (2006.01) |
| ***G02F 1/1337*** | (2006.01) |
| ***C08G 73/10*** | (2006.01) |

(52) U.S. Cl.

CPC ........... *C09K 19/56* (2013.01); *C08G 73/1085* (2013.01); *C08J 5/18* (2013.01); *C08L 79/08* (2013.01); *G02F 1/133723* (2013.01); *C08J 2379/08* (2013.01)

(58) Field of Classification Search

CPC ...................... C08G 73/1085; G02F 1/333723

USPC ........................................................ 528/289

See application file for complete search history.

(56) References Cited

U.S. PATENT DOCUMENTS 9,188,812 B2 * 11/2015 Tsai .................. G02F 1/133723
2016/0024386 A1 * 1/2016 Chiou .................... C09K 19/56 524/104

FOREIGN PATENT DOCUMENTS

JP 09-176651 7/1997
TW 201341431 10/2013

OTHER PUBLICATIONS

"Office Action of Taiwan Counterpart Application," issued on Sep. 17, 2015, p. 1-p. 3.

* cited by examiner

*Primary Examiner* — Tae H Yoon
(74) *Attorney, Agent, or Firm* — Jianq Chyun IP Office

(57) ABSTRACT

A liquid crystal alignment agent capable of forming a liquid crystal alignment film having good ultraviolet reliability, the liquid crystal alignment film, and a liquid crystal display element having the same are provided. The liquid crystal alignment agent includes a polymer (A) and a solvent (B). The polymer (A) is obtained by reacting a mixture. The mixture includes a tetracarboxylic dianhydride component (a) and a diamine component (b). The diamine component (b) includes a diamine compound (b-1) represented by formula (1) and a diamine compound (b-2) represented by formula (2).

formula (1)

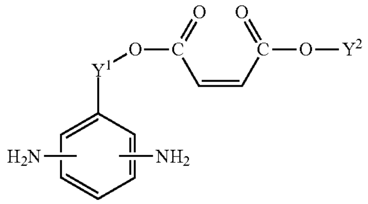

formula (2)

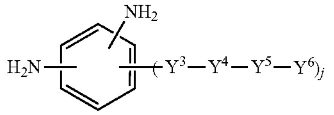

11 Claims, 1 Drawing Sheet

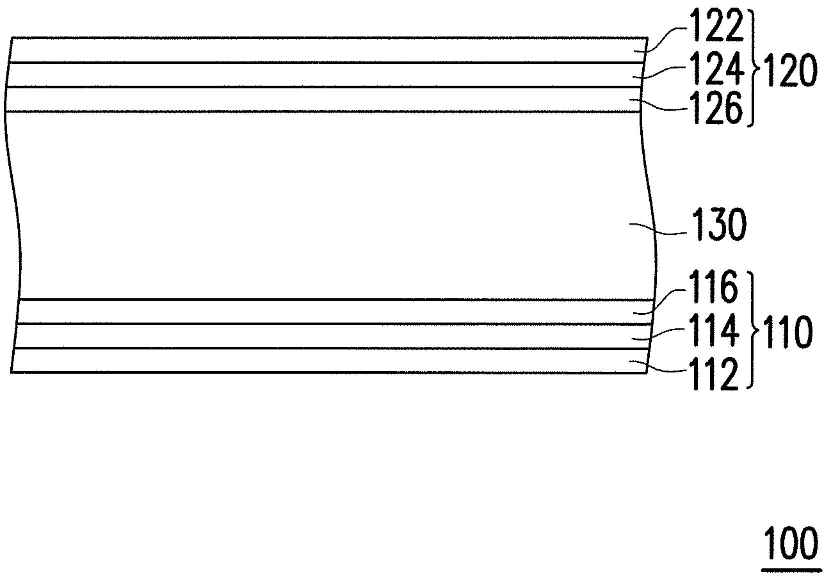
122
124
120
126
130
116
114
110
112
100

LIQUID CRYSTAL ALIGNMENT AGENT, LIQUID CRYSTAL ALIGNMENT FILM, AND LIQUID CRYSTAL DISPLAY ELEMENT

CROSS-REFERENCE TO RELATED APPLICATION

This application claims the priority benefit of Taiwan application serial no. 103119784, filed on Jun. 6, 2014. The entirety of the above-mentioned patent application is hereby incorporated by reference herein and made a part of this specification.

BACKGROUND OF THE INVENTION

1. Field of the Invention

The invention relates to a liquid crystal alignment agent, a liquid crystal alignment film, and a liquid crystal display element. More particularly, the invention relates to a liquid crystal alignment agent capable of forming a liquid crystal alignment film having good ultraviolet reliability, a liquid crystal alignment film formed by the liquid crystal alignment agent, and a liquid crystal display element having the liquid crystal alignment film.

2. Description of Related Art

In recent years, due to the gradual increase in the consumer demand for wide viewing angle characteristics of the liquid crystal display, the demand for electrical characteristics or display characteristics of the wide viewing angle liquid crystal display element is higher. Among wide viewing angle liquid crystal display elements, the vertical alignment liquid crystal display element is the most commonly studied. Therefore, to have better electrical characteristics and display characteristics, the liquid crystal alignment film has become one of the important objects of study for improving the characteristics of the vertical alignment liquid crystal display element. In particular, after the large-size LCD TV has been put into extensive use, maintaining the reliability of prolonged use has become more important for the large-size LCD TV in comparison to a display that mainly displays characters or still pictures.

Japanese Unexamined Patent Publication No. 9-176651 discloses a liquid crystal alignment film having high pretilt angle. By using a tetracarboxylic dianhydride compound having a steroid skeleton and a diamine compound having a steroid skeleton in the liquid crystal alignment film at the same time, high pretilt angle of the liquid crystal alignment film can still be maintained after a reliability test. However, the liquid crystal alignment film has the issue of poor ultraviolet reliability. Specifically, after the liquid crystal alignment film is irradiated by ultraviolet for a period of time, the situation of significantly reduced voltage holding ratio of the liquid crystal display occurs, thereby causing issues such as reduced contrast of the liquid crystal display.

Therefore, how to provide a liquid crystal alignment agent capable of forming a liquid crystal alignment film having good ultraviolet reliability used in a liquid crystal display element such that high voltage holding ratio is still maintained after prolonged ultraviolet irradiation is a current issue those skilled in the art urgently need to solve.

SUMMARY OF THE INVENTION

Accordingly, the invention provides a liquid crystal alignment agent capable of forming a liquid crystal alignment film having good ultraviolet reliability, a liquid crystal alignment film formed by the liquid crystal alignment agent, and a liquid crystal display element having the liquid crystal alignment film.

The invention provides a liquid crystal alignment agent including a polymer (A) and a solvent (B). The polymer (A) is obtained by reacting a mixture. The mixture includes a tetracarboxylic dianhydride component (a) and a diamine component (b). The diamine component (b) includes a diamine compound (b-1) represented by formula (1) and a diamine compound (b-2) represented by formula (2).

Specifically, the diamine compound (b-1) represented by formula (1) is as follows.

formula (1)

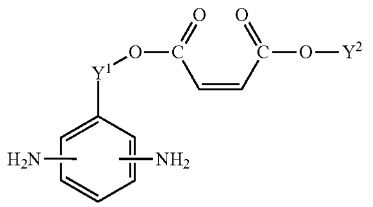

In formula (1), $Y^1$ represents a $C_1$ to $C_{12}$ alkylene group; and $Y^2$ represents a group having a steroid (cholesterol) skeleton, or a group represented by formula (1-1).

The group represented by formula (1-1) is as shown below.

formula (1-1)

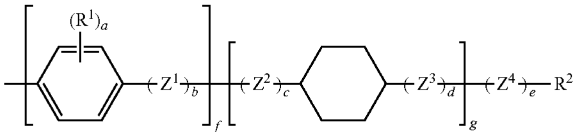

In formula (1-1), $R^1$ each independently represents a fluorine atom or a methyl group; $R^2$ represents a hydrogen atom, a fluorine atom, a $C_1$ to $C_{12}$ alkyl group, a $C_1$ to $C_{12}$ fluoroalkyl group, a $C_1$ to $C_{12}$ alkoxy group, $—OCH_2F$, $—OCHF_2$, or $—OCF_3$; $Z^1$, $Z^2$, and $Z^3$ each independently represent a single bond, a $C_1$ to $C_3$ alkylene group,

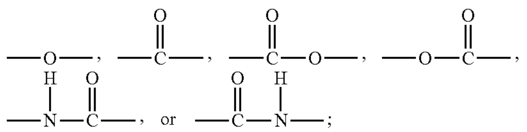

$Z^4$ each independently represents

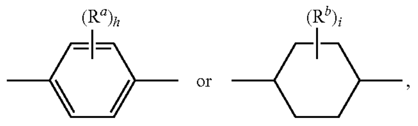

$R^a$ and $R^b$ each independently represent a fluorine atom or a methyl group, h and i each independently represent 0, 1, or 2; a represents 0, 1, or 2; b, c, and d each independently represent an integer of 0 to 4; and e, f, and g each independently represent an integer of 0 to 3, and e+f+g≥1.

Moreover, the diamine compound (b-2) represented by formula (2) is as follows.

formula (2)

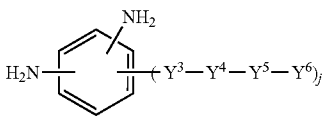

In formula (2), $Y^3$ each independently represents

—O—, —NH—, —N($CH_3$)—, —C(=O)—N(H)—, —N(H)—C(=O)—, —$CH_2$O—, —O—C(=O)—, —C(=O)—N($CH_3$)—, or —N($CH_3$)—C(=O)—;

$Y^4$ each independently represents a single bond, a $C_1$ to $C_{20}$ divalent aromatic hydrocarbon group, a divalent alicyclic hydrocarbon group, or a divalent aromatic hydrocarbon group; $Y^5$ each independently represents a single bond, —O—, —NH—, —N($CH_3$)—, —C(=O)—N(H)—, —N(H)—C(=O)—, —C(=O)—O—, —O—C(=O)—, —C(=O)—N($CH_3$)—, —N($CH_3$)—C(=O)—, or —O($CH_2$)$_m$—, wherein m represents an integer of 1 to 5; $Y^6$ each independently represents a nitrogen-containing aromatic heterocyclic group; and j represents an integer of 1 to 4.

In an embodiment of the invention, in formula (2), $Y^3$ each independently represents —O—, —NH—, —C(=O)—N(H)—, —N(H)—C(=O)—, —$CH_2$O—, —C(=O)—N($CH_3$)—, or —N($CH_3$)—C(=O)—.

In an embodiment of the invention, in formula (2), $Y^4$ each independently represents a single bond, a $C_1$ to $C_5$ alkylene group, or a phenylene group.

In an embodiment of the invention, in formula (2), $Y^5$ each independently represents a single bond, —O—, —C(=O)—N(H)—, —N(H)—C(=O)—, —C(=O)—O—, —O—C(=O)—, or —O($CH_2$)$_m$—, wherein m represents an integer of 1 to 5.

In an embodiment of the invention, in formula (2), $Y^6$ each independently represents a pyrrolyl group, an imidazolyl group, a pyrazolyl group, a pyridyl group, or a pyrimidinyl group.

In an embodiment of the invention, in formula (2), j represents an integer of 1 to 3.

In an embodiment of the invention, based on a usage amount of 100 moles of the diamine component (b), the usage amount of the diamine compound (b-1) represented by formula (1) is 5 moles to 50 moles, and the usage amount of the diamine compound (b-2) represented by formula (2) is 1 mole to 20 moles.

In an embodiment of the invention, the molar ratio (b-1)/(b-2) of the diamine compound (b-1) represented by formula (1) and the diamine compound (b-2) represented by formula (2) is 0.5 to 10.

In an embodiment of the invention, the imidization ratio of the polymer (A) is 30% to 90%.

The invention further provides a liquid crystal alignment film. The liquid crystal alignment film is formed by the above liquid crystal alignment agent.

The invention further provides a liquid crystal display element. The liquid crystal display element includes the above liquid crystal alignment film.

Based on the above, the ultraviolet reliability of the liquid crystal alignment film formed by the liquid crystal alignment agent of the invention is good and is therefore suitable for a liquid crystal display element.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 1 is a side view of a liquid crystal display element according to an embodiment of the invention.

DESCRIPTION OF THE EMBODIMENTS

Liquid Crystal Alignment Agent

The invention provides a liquid crystal alignment agent including a polymer (A) and a solvent (B). Moreover, the liquid crystal alignment agent can further include an additive (C) if needed.

In the following, each component of the liquid crystal alignment agent of the invention is described in detail.

It should be mentioned that, in the following, (meth)acrylic acid represents acrylic acid and/or methacrylic acid, and (meth)acrylate represents acrylate and/or methacrylate. Similarly, (meth)acryloyl group represents acryloyl group and/or methacryloyl group.

Polymer (A)

The polymer (A) is obtained by reacting a mixture. The mixture includes a tetracarboxylic dianhydride component (a) and a diamine component (b).

Tetracarboxylic Dianhydride Component (a)

The tetracarboxylic dianhydride component (a) includes an aliphatic tetracarboxylic dianhydride compound, an alicyclic tetracarboxylic dianhydride compound, an aromatic tetracarboxylic dianhydride compound, at least one of the tetracarboxylic dianhydride compounds represented by formula (I-1) to formula (I-6), or a combination of the compounds.

Specific examples of the aliphatic tetracarboxylic dianhydride compound can include, but are not limited to, ethane tetracarboxylic dianhydride, butane tetracarboxylic dianhydride, or a combination of the compounds.

Specific examples of the alicyclic tetracarboxylic dianhydride compound can include, but are not limited to, 1,2,3,4-cyclobutane tetracarboxylic dianhydride, 1,2-dimethyl-1,2,3,4-cyclobutane tetracarboxylic dianhydride, 1,3-dimethyl-1,2,3,4-cyclobutane tetracarboxylic dianhydride, 1,3-dichloro-1,2,3,4-cyclobutane tetracarboxylic dianhydride, 2,3,4-tetramethyl-1,2,3,4-cyclobutane tetracarboxylic dianhydride, 1,2,3,4-cyclopentane tetracarboxylic dianhydride, 1,2,4,5-cyclohexane tetracarboxylic dianhydride, 3,3',4,4'-dicyclohexyl tetracarboxylic dianhydride, cis-3,7-dibutyl cycloheptyl-1,5-diene-1,2,5,6-tetracarboxylic dianhydride, 2,3,5-tricarboxycyclopentylacetic dianhydride, bicyclo[2.2.2]-oct-7-ene-2,3,5,6-tetracarboxylic dianhydride, or a combination of the compounds.

Specific examples of the aromatic tetracarboxylic dianhydride compound can include, but are not limited to, an aromatic tetracarboxylic dianhydride compound such as 3,4-dicarboxy-1,2,3,4-tetrahydronaphthalene-1-succinic dianhydride, pyromellitic dianhydride, 3,3',4,4'-benzophenone tetracarboxylic dianhydride, 3',3,4,4'-biphenylsulfone tetracarboxylic dianhydride, 1,4,5,8-naphthalene tetracarboxylic dianhydride, 2,3,6,7-naphthalene tetracarboxylic dianhydride, 3,3'-4,4'-diphenyl ethane tetracarboxylic dianhydride, 3,3',4,4'-dimethyl diphenyl silane tetracarboxylic dianhydride, 3,3',4,4'-tetraphenyl silane tetracarboxylic dianhydride, 2,3,4-furan tetracarboxylic dianhydride, 4,4'-bis(3,4-dicarboxy phenoxy)diphenylsulfide dianhydride, 4,4'-bis(3,4-dicarboxy phenoxy)diphenylsulfone dianhydride, 4,4'-bis(3,4-dicarboxy phenoxy)diphenylpropane dianhydride, 3,3',4,4'-perfluoroisopropylidene diphenyl dicarboxylic dianhydride, 3,3',4,4'-diphenyl tetracarboxylic dianhydride, bis(phthalic acid)phenylphosphine oxide dianhydride, p-phenylene-bis(triphenylphthalic acid)dianhydride, m-phenylene-bis(triphenylphthalic acid) dianhydride, bis(triphenylphthalic acid)-4,4'-diphenylether dianhydride, bis(triphenylphthalic acid)-4,4'-diphenylmethane dianhydride, ethylene glycol-bis(anhydrotrimellitate), propylene glycol-bis(anhydrotrimellitate), 1,4-butanediol-bis(anhydrotrimellitate), 1,6-hexanediol-bis(anhydrotrimellitate), 1,8-octanediol-bis(anhydrotrimellitate), 2,2-bis(4-hydroxyphenyl) propane-bis(anhydrotrimellitate), 2,3,4,5-tetrahydrofuran tetracarboxylic dianhydride, 1,3,3a,4,5,9b-hexahydro-5-(tetrahydro-2,5-dioxo-3-furanyl)naphtho[1,2-c]furan-1,3-dione, 1,3,3a,4,5,9b-hexahydro-5-methyl-5-(tetrahydro-2,5-dioxo-3-furanyl)naphtho[1,2-c]furan-1,3-dione, 1,3,3a,4,5,9b-hexahydro-5-ethyl-5-(tetrahydro-2,5-dioxo-3-furanyl) naphtho[1,2-c]furan-1,3-dione, 1,3,3a,4,5,9b-hexahydro-7-methyl-5-(tetrahydro-2,5-dioxo-3-furanyl) naphtho[1,2-c] furan-1,3-dione, 1,3,3a,4,5,9b-hexahydro-7-ethyl-5-(tetrahydro-2,5-dioxo-3-furanyl)naphtho[1,2-c]furan-1,3-dione, 1,3,3a,4,5,9b-hexahydro-8-methyl-5-(tetrahydro-2,5-dioxo-3-furanyl)naphtho[1,2-c]furan-1,3-dione, 1,3,3a,4,5,9b-hexahydro-8-ethyl-5-(tetrahydro-2,5-dioxo-3-furanyl) naphtho[1,2-c]furan-1,3-dione, 1,3,3a,4,5,9b-hexahydro-5,8-dimethyl-5-(tetrahydro-2,5-dioxo-3-furanyl)naphtho[1,2-c]furan-1,3-dione, 5-(2,5-dioxotetrahydrofural)-3-methyl-3-cyclohexene-1,2-dicarboxylic dianhydride, or a combination of the compounds.

The tetracarboxylic dianhydride compounds represented by formula (I-1) to formula (I-6) are as shown below.

formula (I-1)

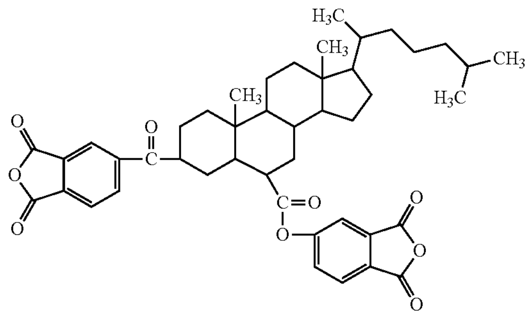

formula (I-2)

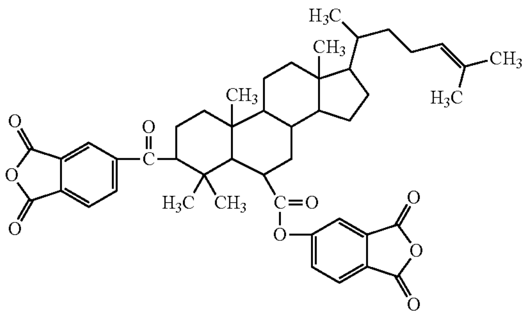

formula (I-3)

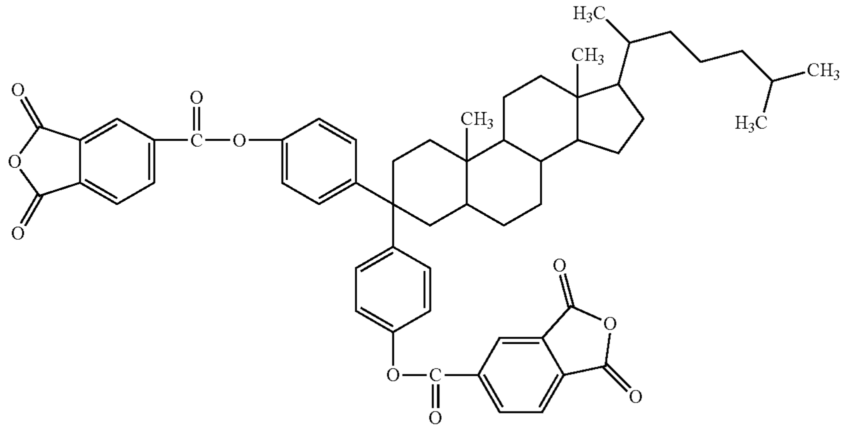

-continued formula (I-4)

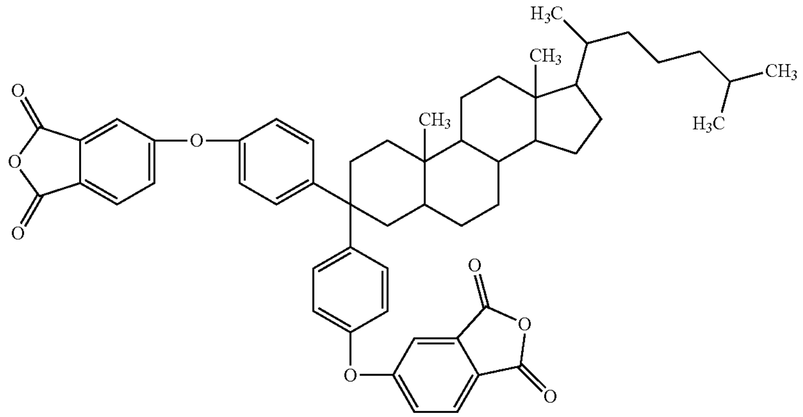

formula (I-5)

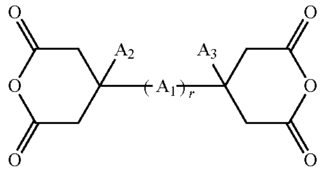

In formula (1-5), $A_1$ represents a divalent group containing an aromatic ring; r represents an integer of 1 to 2; and $A_2$ and $A_3$ can be the same or different, and can each independently represent a hydrogen atom or an alkyl group. Specific examples of the tetracarboxylic dianhydride compound represented by formula (I-5) include at least one of the compounds represented by formula (I-5-1) to formula (I-5-3).

formula (I-5-1)

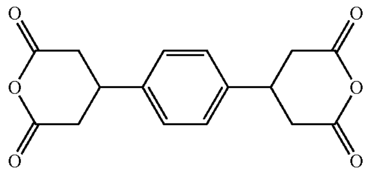

formula (I-5-2)

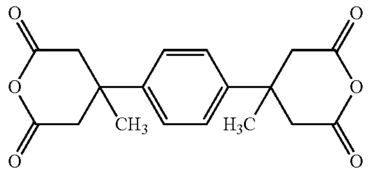

formula (I-5-3)

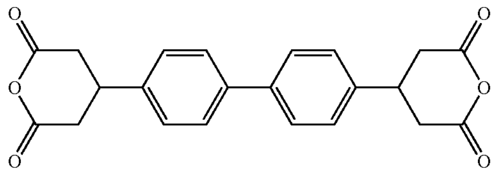

formula (I-6)

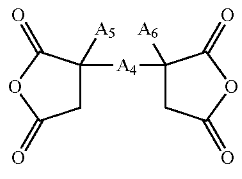

In formula (I-6), $A_4$ represents a divalent group containing an aromatic ring; and $A_5$ and $A_6$ can be the same or different, and each independently represent a hydrogen atom or an alkyl group. The tetracarboxylic dianhydride compound represented by formula (I-6) is preferably a compound represented by formula (I-6-1).

formula (I-6-1)

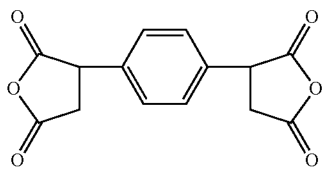

The tetracarboxylic dianhydride component (a) can be used alone or in multiple combinations.

Diamine Component (b)

The diamine component (b) includes a diamine compound (b-1) and a diamine compound (b-2). Moreover, in addition to the diamine compound (b-1) and the diamine compound (b-2), the diamine component (b) can further include a diamine compound (b-3).

Diamine Compound (b-1)

The diamine compound (c-1) is a compound represented by formula (1).

formula (1)

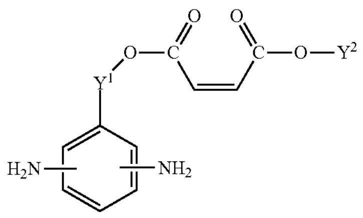

In formula (1), $Y^1$ represents a $C_1$ to $C_{12}$ alkylene group; and $Y^2$ represents a group having a steroid (cholesterol) skeleton, or a group represented by formula (1-1).

The group represented by formula (1-1) is as shown below.

formula (1-1)

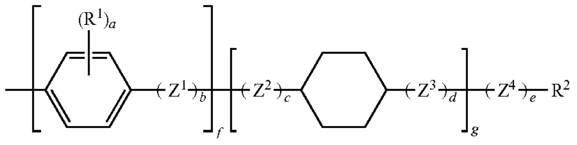

In formula (1-1), $R^1$ each independently represents a fluorine atom or a methyl group; $R^2$ represents a hydrogen atom, a fluorine atom, a $C_1$ to $C_{12}$ alkyl group, a $C_1$ to $C_{12}$ fluoroalkyl group, a $C_1$ to $C_{12}$ alkoxy group, —$OCH_2F$, —$OCHF_2$, or —$OCF_3$; $Z^1$, $Z^2$, and $Z^3$ each independently represent a single bond, a $C_1$ to $C_3$ alkylene group,

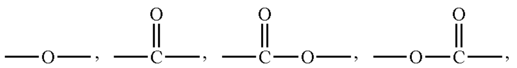

-continued

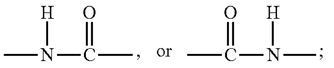

$Z^4$ each independently represents

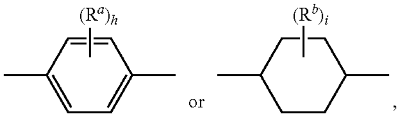

$R^a$ and $R^b$ each independently represent a fluorine atom or a methyl group, h and i each independently represent 0, 1, or 2; a represents 0, 1, or 2; b, c, and d each independently represent an integer of 0 to 4; and e, f, and g each independently represent an integer of 0 to 3, and e+f+g≥1.

Specific examples of the diamine compound (b-1) include at least one of the compounds represented by formula (1-2) to formula (1-19).

formula (1-2)

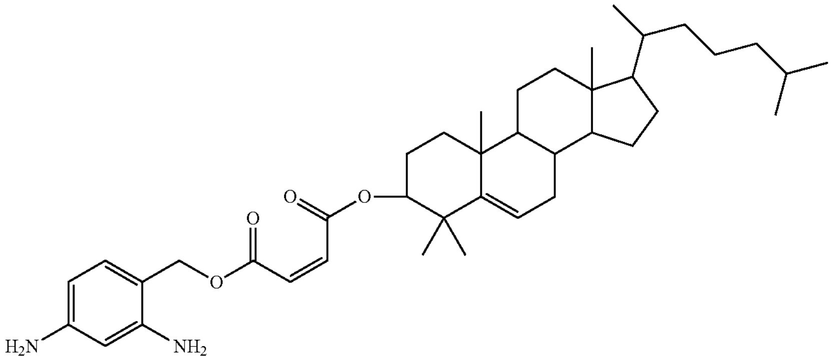

formula (1-3)

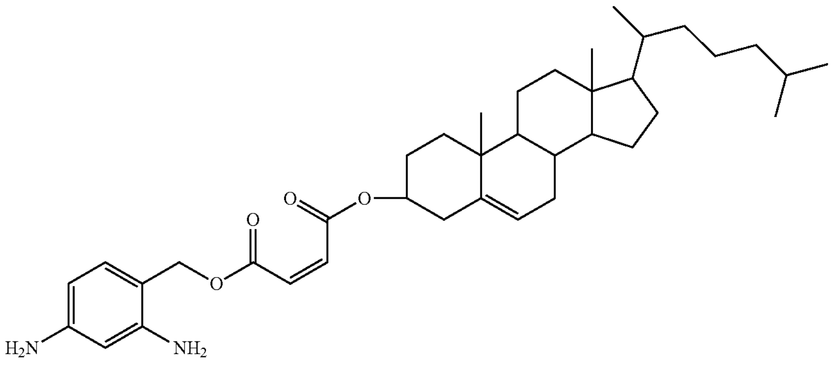

-continued
formula (1-4)
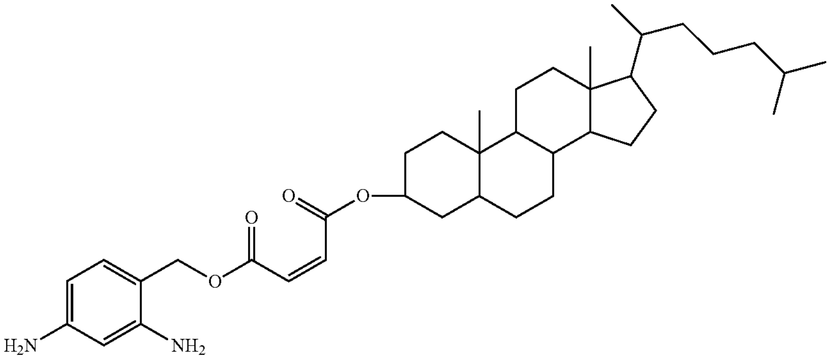
formula (1-5)
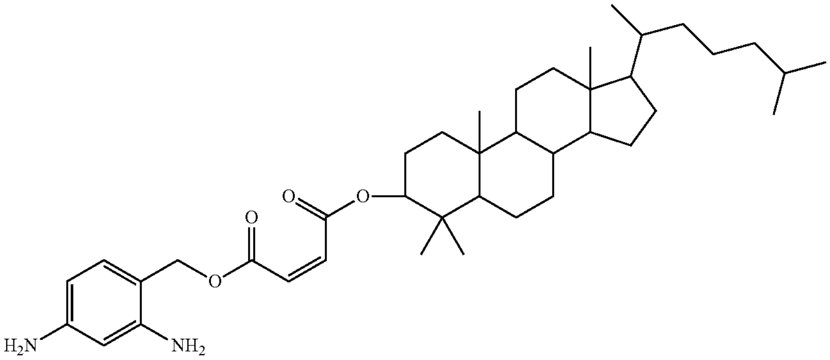
formula (1-6)
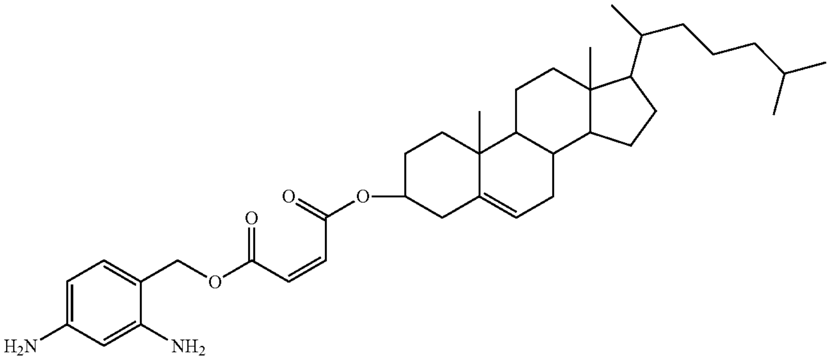
formula (1-7)
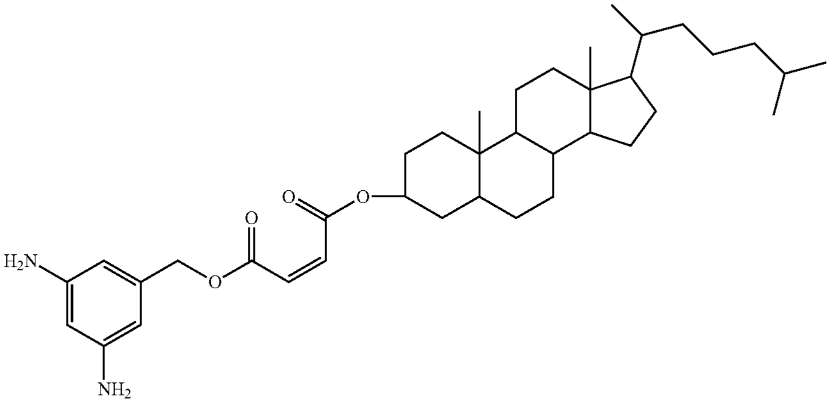

-continued
formula (1-8)
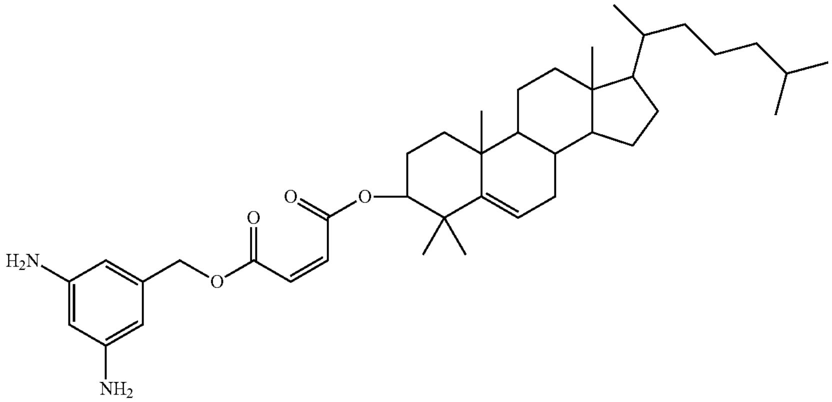
formula (1-9)
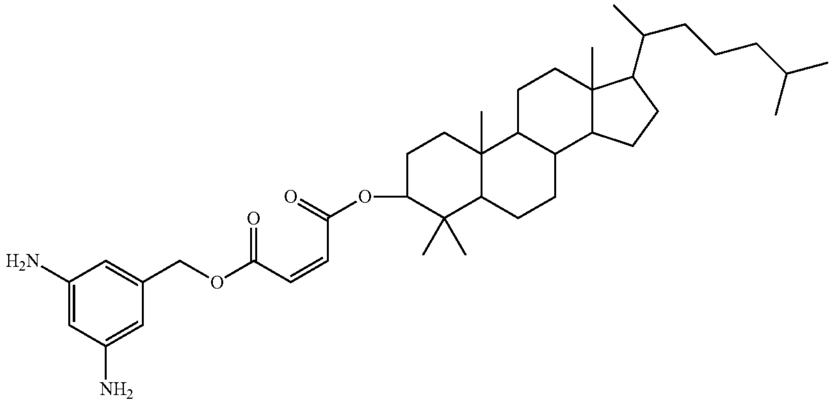
formula (1-10)
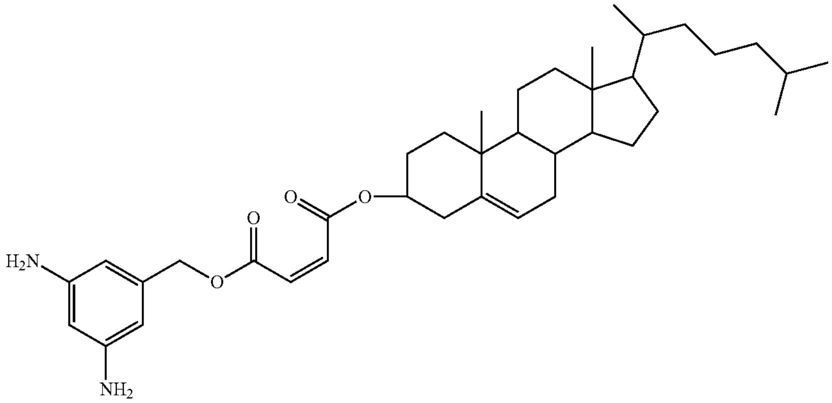
formula (1-11)
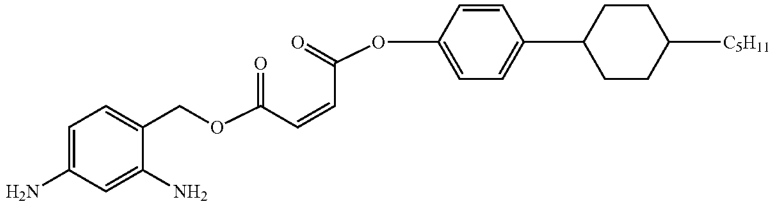
formula (1-12)
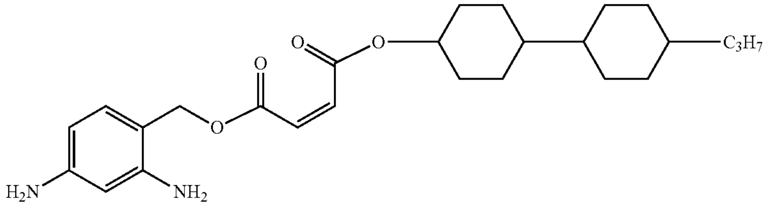

-continued
formula (1-13)
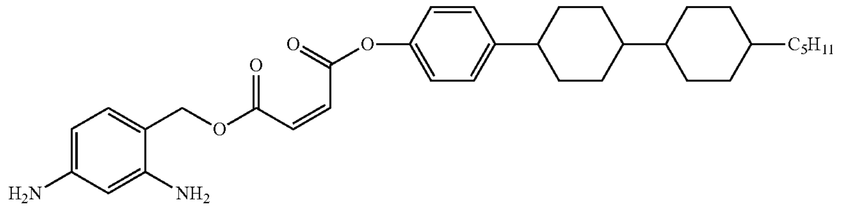
formula (1-14)
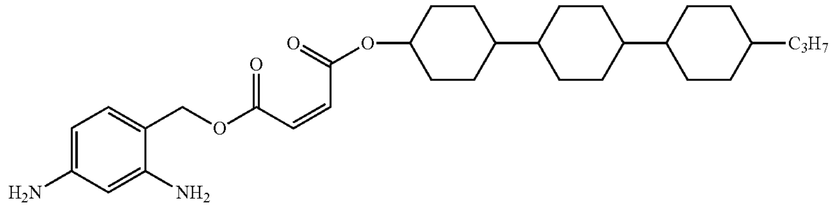
formula (1-15)
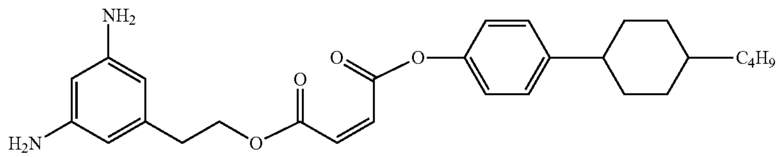
formula (1-16)
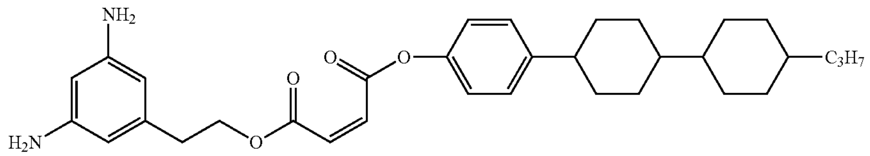
formula (1-17)
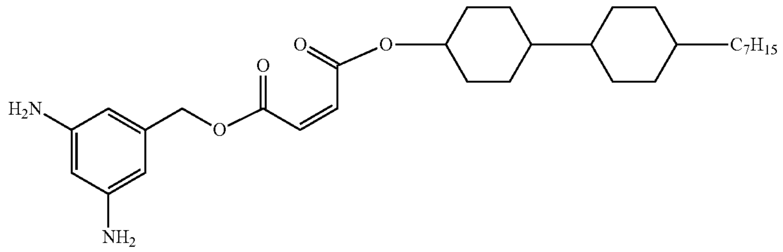
formula (1-18)
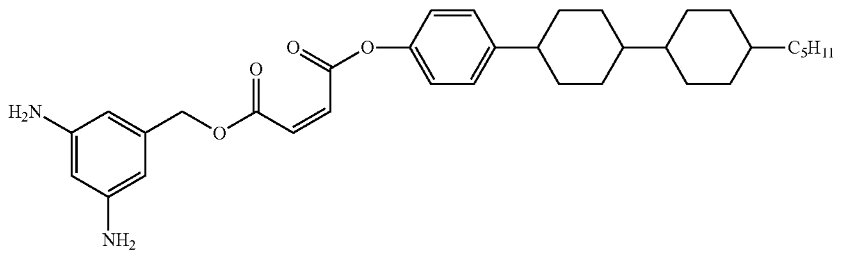
formula (1-19)
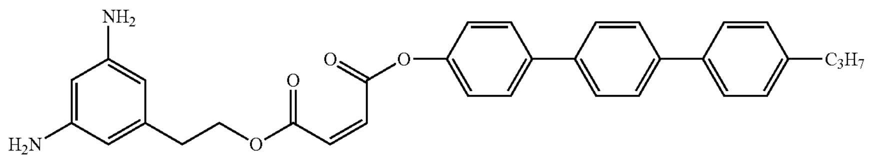

The diamine compound (b-1) can be prepared by a general organic synthesis method. For instance, the compounds represented by formula (1-2) to formula (1-19) can respectively be formed by first adding a maleic anhydride on a compound having a steroid skeleton or a compound represented by formula (1-20). Next, under the existence of potassium carbonate, a dinitrobenzoyl chloride compound is added to perform an esterification reaction. Then, a reduction reaction is performed by adding a suitable reducing agent such as tin chloride to synthesize the diamine compound (b-1).

formula (1-20)

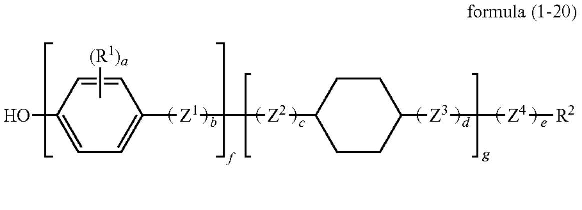

In formula (1-20), the definition of each of $R^1$, $R^2$, $Z^1$, $Z^2$, $Z^3$, $Z^4$, a, b, c, d, e, f, and g is respectively the same as the definition of each of $R^1$, $R^2$, $Z^1$, $Z^2$, $Z^3$, $Z^4$, a, b, c, d, e, f, and g in formula (1-1), and is not repeated herein.

The compound represented by formula (1-20) can be synthesized by a general method such as a Grignard reaction or a Friedal-Crafts acylation reaction for synthesizing a liquid crystal compound.

When the diamine compound (b-1) is not used in the polymer (A) in the liquid crystal alignment agent, the formed liquid crystal alignment film has the issue of poor ultraviolet reliability.

Based on a usage amount of 100 moles of the diamine component (b), the usage amount of the diamine compound (b-1) can be 5 moles to 50 moles, preferably 8 moles to 40 moles, and more preferably 10 moles to 30 moles.

Diamine Compound (b-2)

The diamine compound (b-2) is a compound represented by formula (2).

formula (2)

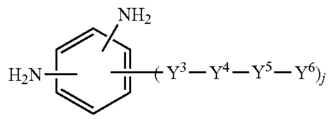

$Y^3$ each independently represents

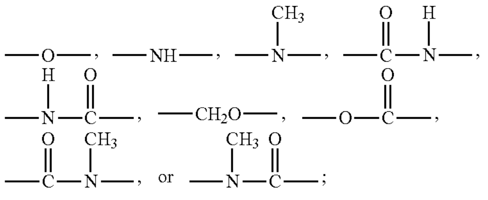

$Y^4$ each independently represents a single bond, a $C_1$ to $C_{20}$ divalent aliphatic hydrocarbon group, a divalent alicyclic hydrocarbon group, or a divalent aromatic hydrocarbon group; $Y^5$ each independently represents a single bond,

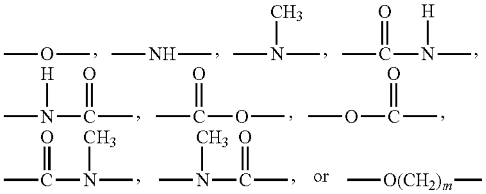

wherein m represents an integer of 1 to 5; $Y^6$ each independently represents a nitrogen-containing aromatic heterocyclic group; and j represents an integer of 1 to 4.

Specifically, the bonding positions of the 2 amino groups (—$NH_2$) in formula (2) are not particularly limited. Specific examples include a bonding group ($Y^3$) relative to a side chain, and the 2 amino groups on the benzene ring are respectively, for instance, 2,3 positions, 2,4 positions, 2,5 positions, 2,6 positions, 3,4 positions, or 3,5 positions. In particular, from the viewpoint of reactivity when polyamic acid is synthesized, the bonding positions of the 2 amino groups are preferably 2,4 positions, 2,5 positions, or 3,5 positions. In terms of ease of synthesizing the diamine compound, the bonding positions of the 2 amino groups are more preferably 2,4 positions or 2,5 positions.

In formula (2), $Y^3$ each independently represents

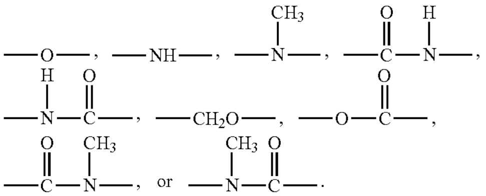

In particular, in terms of ease of synthesizing the diamine compound, $Y^3$ preferably each independently represents

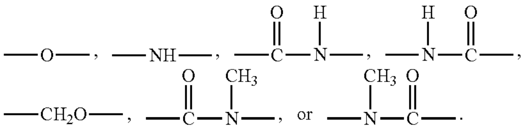

In formula (2), $Y^4$ each independently represents a single bond, a $C_1$ to $C_{20}$ divalent aliphatic hydrocarbon group, a divalent alicyclic hydrocarbon group, or a divalent aromatic hydrocarbon group. The $C_1$ to $C_{20}$ divalent aliphatic hydrocarbon group can be straight-chain or branched-chain, can also have an unsaturated bond, and is preferably a $C_1$ to $C_{10}$ divalent aliphatic hydrocarbon group. Specific examples of the alicyclic ring in the divalent alicyclic hydrocarbon group include, for instance, a cyclopropane ring, a cyclobutane ring, a cyclopentane ring, a cyclohexane ring, a cycloheptane ring, a cyclooctane ring, a cyclononane ring, a cyclodecane ring, a cycloundecane ring, a cyclododecane ring, a cyclotridecane ring, a cyclotetradecane ring, a cyclopentadecane ring, a cyclohexadecane ring, a cycloheptadecane ring, a cyclooctadecane ring, a cyclononadecane ring, a cycloeicosane ring, a tricycloeicosane ring, a tricyclodocosane ring, a bicycloheptane ring, a decahydronaphthalene ring, a norbomene ring, or an adamantane ring.

Specific examples of the aromatic ring in the divalent aromatic hydrocarbon group include, for instance, a benzene ring, a naphthalene ring, a tetrahydronaphthalene ring, an azulene ring, an indene ring, a fluorene ring, an anthracene ring, a phenanthrene, or a phenalene ring.

Specifically, in formula (2), $Y^4$ preferably each independently represents a single bond, a $C_1$ to $C_{10}$ straight-chain or branched-chain alkylene group, a $C_1$ to $C_m$ straight-chain or branched-chain alkenylene group, a $C_1$ to $C_{10}$ straight-chain or branched-chain alkynylene group, a divalent alicyclic hydrocarbon group, or a divalent aromatic hydrocarbon group, wherein the alicyclic ring is a cyclopropane ring, a cyclobutane ring, a cyclopentane ring, a cyclohexane ring, a cycloheptane ring, a norbornene ring, or an adamantane ring, and the aromatic ring is a benzene ring, a naphthalene ring, a tetrahydronaphthalene ring, a fluorene ring, or an anthracene ring. $Y^4$ more preferably each independently represents a single bond, a $C_1$ to $C_{10}$ straight-chain or branched-chain alkylene group, a $C_1$ to $C_{10}$ straight-chain or branched-chain alkenylene group, a divalent alicyclic hydrocarbon group, or a divalent aromatic hydrocarbon group, wherein the alicyclic ring is a cyclohexane ring, a norbornene ring, or an adamantane ring, and the aromatic ring is a benzene ring, a naphthalene ring, a fluorene ring, or an anthracene ring. $Y^4$ yet more preferably each independently represents a single bond, a $C_1$ to $C_{10}$ straight-chain or branched-chain alkylene group, a cyclohexylene group, a phenylene group, or a naphthylene group. $Y^4$ even more preferably each independently represents a single bond, a $C_1$ to $C_5$ straight-chain or branched-chain alkylene group, or a phenylene group.

In formula (2), $Y^5$ each independently represents a single bond, $$—O—,\ —NH—,\ —N(CH_3)—,\ —C(=O)—N(H)—,\ —N(H)—C(=O)—,\ —C(=O)—O—,\ —O—C(=O)—,\ —C(=O)—N(CH_3)—,\ —N(CH_3)—C(=O)—,\ \text{or}\ —O(CH_2)_m—,$$

wherein m represents an integer of 1 to 5. $Y^5$ preferably each independently represents a single bond, $$—O—,\ —C(=O)—N(H)—,\ —N(H)—C(=O)—,\ —C(=O)—O—,\ —O—C(=O)—,\ \text{or}\ —O(CH_2)_m—,$$

wherein m represents an integer of 1 to 5.

In formula (2), $Y^6$ each independently represents a nitrogen-containing aromatic heterocyclic group. Specifically, the nitrogen-containing aromatic heterocyclic group is a nitrogen-containing aromatic heterocyclic group containing at least one structure selected from the group consisting of formula (2a), formula (2b), and formula (2c).

formula (2a)

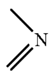

-continued formula (2b)

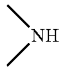

formula (2c)

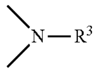

In formula (2c), $R^3$ represents a $C_1$ to $C_5$ straight-chain or branched-chain alkylene group.

Specific examples of the nitrogen-containing aromatic heterocyclic group in $Y^6$ include a pyrrole ring, an imidazole ring, an oxazole ring, a thiazole ring, a pyrazole ring, a pyridine ring, a pyrimidine ring, a quinoline ring, a pyrazoline ring, an isoquinoline ring, a carbazole ring, a purine ring, a thiadiazole ring, a pyridazine ring, a pyrazoline ring, a triazine ring, a pyrazolidine ring, a triazole ring, a pyrazine ring, a benzimidazole ring, a phenanthroline ring, an indole ring, a quinoxaline ring, a benzothiazole ring, a phenothiazine ring, an oxadiazole ring, or an acridine ring. Specifically, $Y^6$ preferably each independently represents a pyrrolyl group, an imidazolyl group, a pyrazolyl group, a pyridyl group, a pyrimidinyl group, a pyridazinyl group, a triazinyl group, a triazolyl group, a pyrazinyl group, or a benzimidazolyl group. $Y^6$ more preferably each independently represents a pyrrolyl group, an imidazolyl group, a pyrazolyl group, a pyridyl group, or a pyrimidinyl group.

Moreover, $Y^5$ is preferably bonded to a substituent not adjacent to formula (2a), formula (2b), and formula (2c) contained in $Y^6$.

In formula (2), j represents an integer of 1 to 4. Moreover, from the viewpoint of reactivity with the tetracarboxylic dianhydride compound, j preferably represents an integer of 1 to 3.

In formula (2), a preferred combination of $Y^3$, $Y^4$, $Y^5$, $Y^6$, and j is: $Y^3$ is $$—O—,\ —NH—,\ —C(=O)—N(H)—,\ —N(H)—C(=O)—,\ —C(=O)—N(CH_3)—,\ —CH_2O—,\ \text{or}\ —O—C(=O)—;$$

$Y^4$ is a $C_1$ to $C_{10}$ straight-chain or branched-chain alkylene group, a $C_1$ to $C_{10}$ straight-chain or branched-chain alkenylene group, a divalent alicyclic hydrocarbon group, or a divalent aromatic hydrocarbon group, wherein the alicyclic ring is a cyclopropane ring, a cyclobutane ring, a cyclopentane ring, a cyclohexane ring, a cycloheptane ring, a norbornene ring, or an adamantane ring, and the aromatic ring is a benzene ring, a naphthalene ring, a tetrahydronaphthalene ring, a fluorene ring, or an anthracene ring; $Y^5$ is a single bond, $$—O—,\ —NH—,\ —C(=O)—N(H)—,$$

-continued

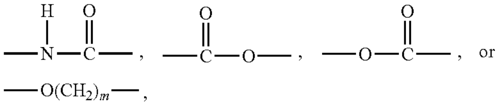

(m is an integer of 1 to 5); the nitrogen-containing aromatic heterocyclic ring in $Y^6$ is a pyrrole ring, an imidazole ring, an oxazole ring, a thiazole ring, a pyrazole ring, a pyridine ring, a pyrimidine ring, a quinoline ring, a pyrazoline ring, an isoquinoline ring, a carbazole ring, a purine ring, a thiadiazole ring, a pyridazine ring, a triazine ring, a pyrazolidine ring, a triazole ring, a pyrazine ring, a benzimidazole ring, a phenanthroline ring, an indole ring, a quinoxaline ring, a benzothiazole ring, a phenothiazine ring, an oxadiazole ring, or an acridine ring; and j is 1 or 2.

In formula (2), a more preferred combination of $Y^3$, $Y^4$, $Y^5$, $Y^6$, and j is: $Y^3$ is

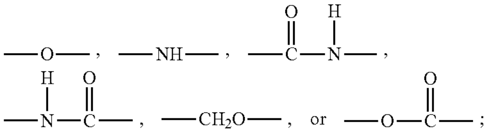

$Y^4$ is a $C_1$ to $C_{10}$ straight-chain or branched-chain alkylene group, a $C_1$ to $C_{10}$ straight-chain or branched-chain alkenylene group, a divalent alicyclic hydrocarbon group, or a divalent aromatic hydrocarbon group, wherein the alicyclic ring is a cyclohexane ring, a norbornene ring, or an adamantane ring, and the aromatic ring is a benzene ring, a naphthalene ring, a fluorene ring, or an anthracene ring; $Y^5$ is a single bond,

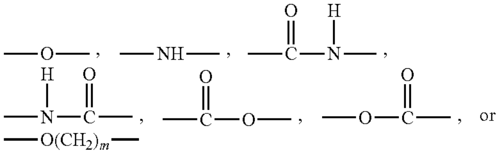

(m is an integer of 1 to 5); $Y^6$ is a pyrrolyl group, an imidazolyl group, a pyrazolyl group, a pyridyl group, a pyrimidinyl group, a pyrazolinyl group, a carbazolyl group, a pyridazinyl group, a pyrazolinyl group, a triazinyl group, a pyrazolidinyl group, a triazolyl group, a pyrazinyl group, or a benzimidazolyl group; and j is 1 or 2.

In formula (2), an even more preferred combination of $Y^3$, $Y^4$, $Y^5$, $Y^6$, and j is: $Y^3$ is

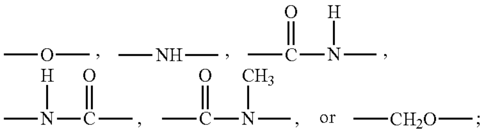

$Y^4$ is a $C_1$ to $C_5$ straight-chain or branched-chain alkylene group or a phenylene group; $Y^5$ is a single bond,

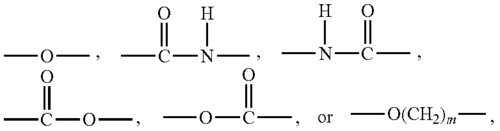

(m is an integer of 1 to 5); $Y^6$ is a pyrrolyl group, an imidazolyl group, a pyrazolyl group, a pyridyl group, or a pyrimidinyl group; and j is 1, 2, or 3.

Specific examples of the diamine compound (b-2) include a diamine compound formed by a combination of $Y^3$, $Y^4$, $Y^5$, $Y^6$, and j of Table I to Table VIII.

TABLE I

| Diamine compound (b-2) No. | $Y^3$ | $Y^4$ | $Y^5$ | $Y^6$ |
|---|---|---|---|---|
| 1 | —O— | $C_1$ to $C_5$ straight-chain or branched-chain alkylene group | single bond | pyrrolyl group |
| 2 | —O— | $C_1$ to $C_5$ straight-chain or branched-chain alkylene group | single bond | imidazole group |
| 3 | —O— | $C_1$ to $C_5$ straight-chain or branched-chain alkylene group | single bond | pyrazolyl group |
| 4 | —O— | $C_1$ to $C_5$ straight-chain or branched-chain alkylene group | single bond | pyridyl group |
| 5 | —O— | $C_1$ to $C_5$ straight-chain or branched-chain alkylene group | single bond | pyrimidinyl group |
| 6 | —NH— | $C_1$ to $C_5$ straight-chain or branched-chain alkylene group | single bond | pyrrolyl group |
| 7 | —NH— | $C_1$ to $C_5$ straight-chain or branched-chain alkylene group | single bond | imidazole group |
| 8 | —NH— | $C_1$ to $C_5$ straight-chain or branched-chain alkylene group | single bond | pyrazolyl group |
| 9 | —NH— | $C_1$ to $C_5$ straight-chain or branched-chain alkylene group | single bond | pyridyl group |
| 10 | —NH— | $C_1$ to $C_5$ straight-chain or branched-chain alkylene group | single bond | pyrimidinyl group |
| 11 | 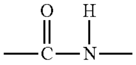 | $C_1$ to $C_5$ straight-chain or branched-chain alkylene group | single bond | pyrrolyl group |
| 12 | 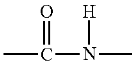 | $C_1$ to $C_5$ straight-chain or branched-chain alkylene group | single bond | imidazole group |
| 13 | 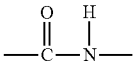 | $C_1$ to $C_5$ straight-chain or branched-chain alkylene group | single bond | pyrazolyl group |
| 14 | 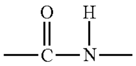 | $C_1$ to $C_5$ straight-chain or branched-chain alkylene group | single bond | pyridyl group |
| 15 | 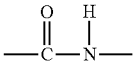 | $C_1$ to $C_5$ straight-chain or branched-chain alkylene group | single bond | pyrimidinyl group |
| 16 | 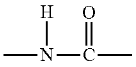 | $C_1$ to $C_5$ straight-chain or branched-chain alkylene group | single bond | pyrrolyl group |
| 17 | 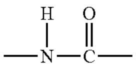 | $C_1$ to $C_5$ straight-chain or branched-chain alkylene group | single bond | imidazole group |

TABLE I-continued

| Diamine compound (b-2) No. | $Y^3$ | $Y^4$ | $Y^5$ | $Y^6$ |
|---|---|---|---|---|
| 18 | —N(H)—C(=O)— | $C_1$ to $C_5$ straight-chain or branched-chain alkylene group | single bond | pyrazolyl group |
| 19 | —N(H)—C(=O)— | $C_1$ to $C_5$ straight-chain or branched-chain alkylene group | single bond | pyridyl group |
| 20 | —N(H)—C(=O)— | $C_1$ to $C_5$ straight-chain or branched-chain alkylene group | single bond | pyrimidinyl group |

TABLE II

| Diamine compound (b-2) No. | $Y^3$ | $Y^4$ | $Y^5$ | $Y^6$ |
|---|---|---|---|---|
| 21 | —$CH_2O$— | $C_1$ to $C_5$ straight-chain or branched-chain alkylene group | single bond | pyrrolyl group |
| 22 | —$CH_2O$— | $C_1$ to $C_5$ straight-chain or branched-chain alkylene group | single bond | imidazole group |
| 23 | —$CH_2O$— | $C_1$ to $C_5$ straight-chain or branched-chain alkylene group | single bond | pyrazolyl group |
| 24 | —$CH_2O$— | $C_1$ to $C_5$ straight-chain or branched-chain alkylene group | single bond | pyridyl group |
| 25 | —$CH_2O$— | $C_1$ to $C_5$ straight-chain or branched-chain alkylene group | single bond | pyrimidinyl group |
| 26 | —C(=O)—N($CH_3$)— | $C_1$ to $C_5$ straight-chain or branched-chain alkylene group | single bond | pyrrolyl group |
| 27 | —C(=O)—N($CH_3$)— | $C_1$ to $C_5$ straight-chain or branched-chain alkylene group | single bond | imidazole group |
| 28 | —C(=O)—N($CH_3$)— | $C_1$ to $C_5$ straight-chain or branched-chain alkylene group | single bond | pyrazolyl group |
| 29 | —C(=O)—N($CH_3$)— | $C_1$ to $C_5$ straight-chain or branched-chain alkylene group | single bond | pyridyl group |
| 30 | —C(=O)—N($CH_3$)— | $C_1$ to $C_5$ straight-chain or branched-chain alkylene group | single bond | pyrimidinyl group |

TABLE III

| Diamine compound (b-2) No. | $Y^3$ | $Y^4$ | $Y^5$ | $Y^6$ |
|---|---|---|---|---|
| 31 | —O— | phenylene group | —O— | pyrrolyl group |
| 32 | —O— | phenylene group | —O— | imidazole group |
| 33 | —O— | phenylene group | —O— | pyrazolyl group |
| 34 | —O— | phenylene group | —O— | pyridyl group |

TABLE III-continued

| Diamine compound (b-2) No. | $Y^3$ | $Y^4$ | $Y^5$ | $Y^6$ |
|---|---|---|---|---|
| 35 | —O— | phenylene group | —C(=O)—N(H)— | pyrimidinyl group |
| 36 | —O— | phenylene group | —C(=O)—N(H)— | pyrrolyl group |
| 37 | —O— | phenylene group | —C(=O)—N(H)— | imidazole group |
| 38 | —O— | phenylene group | —C(=O)—N(H)— | pyrazolyl group |
| 39 | —O— | phenylene group | —N(H)—C(=O)— | pyridyl group |
| 40 | —O— | phenylene group | —N(H)—C(=O)— | pyrimidinyl group |
| 41 | —O— | phenylene group | —N(H)—C(=O)— | pyrrolyl group |
| 42 | —O— | phenylene group | —N(H)—C(=O)— | imidazole group |
| 43 | —O— | phenylene group | —C(=O)—O— | pyrazolyl group |
| 44 | —O— | phenylene group | —C(=O)—O— | pyridyl group |
| 45 | —O— | phenylene group | —C(=O)—O— | pyrimidinyl group |
| 46 | —O— | phenylene group | —C(=O)—O— | pyrrolyl group |
| 47 | —O— | phenylene group | —O—C(=O)— | imidazole group |
| 48 | —O— | phenylene group | —O—C(=O)— | pyrazolyl group |
| 49 | —O— | phenylene group | —O—C(=O)— | pyridyl group |
| 50 | —O— | phenylene group | —O—C(=O)— | pyrimidinyl group |
| 51 | —O— | phenylene group | —O$(CH_2)_m$— (m: 1-5) | pyrrolyl group |
| 52 | —O— | phenylene group | —O$(CH_2)_m$— (m: 1-5) | imidazole group |
| 53 | —O— | phenylene group | —O$(CH_2)_m$— (m: 1-5) | pyrazolyl group |
| 54 | —O— | phenylene group | —O$(CH_2)_m$— (m: 1-5) | pyridyl group |
| 55 | —NH— | phenylene group | —O— | pyrrolyl group |

TABLE III-continued

| Diamine compound (b-2) No. | $Y^3$ | $Y^4$ | $Y^5$ | $Y^6$ |
|---|---|---|---|---|
| 56 | —NH— | phenylene group | —O— | imidazole group |
| 57 | —NH— | phenylene group | —O— | pyrazolyl group |
| 58 | —NH— | phenylene group | —O— | pyridyl group |
| 59 | —NH— | phenylene group | —C(=O)—N(H)— | pyrimidinyl group |
| 60 | —NH— | phenylene group | —C(=O)—N(H)— | pyrrolyl group |

TABLE IV

| Diamine compound (b-2) No. | $Y^3$ | $Y^4$ | $Y^5$ | $Y^6$ |
|---|---|---|---|---|
| 61 | —NH— | phenylene group | —C(=O)—N(H)— | imidazole group |
| 62 | —NH— | phenylene group | —C(=O)—N(H)— | pyrazolyl group |
| 63 | —NH— | phenylene group | —N(H)—C(=O)— | pyridyl group |
| 64 | —NH— | phenylene group | —N(H)—C(=O)— | pyrimidinyl group |
| 65 | —NH— | phenylene group | —N(H)—C(=O)— | pyrrolyl group |
| 66 | —NH— | phenylene group | —N(H)—C(=O)— | imidazole group |
| 67 | —NH— | phenylene group | —C(=O)—O— | pyrazolyl group |
| 68 | —NH— | phenylene group | —C(=O)—O— | pyridyl group |
| 69 | —NH— | phenylene group | —C(=O)—O— | pyrimidinyl group |
| 70 | —NH— | phenylene group | —C(=O)—O— | pyrrolyl group |
| 71 | —NH— | phenylene group | —O—C(=O)— | imidazole group |
| 72 | —NH— | phenylene group | —O—C(=O)— | pyrazolyl group |
| 73 | —NH— | phenylene group | —O—C(=O)— | pyridyl group |

TABLE IV-continued

| Diamine compound (b-2) No. | $Y^3$ | $Y^4$ | $Y^5$ | $Y^6$ |
|---|---|---|---|---|
| 74 | —NH— | phenylene group | —O—C(=O)— | pyrimidinyl group |
| 75 | —NH— | phenylene group | $—O(CH_2)_m—$ (m: 1-5) | pyrrolyl group |
| 76 | —NH— | phenylene group | $—O(CH_2)_m—$ (m: 1-5) | imidazole group |
| 77 | —NH— | phenylene group | $—O(CH_2)_m—$ (m: 1-5) | pyrazolyl group |
| 78 | —NH— | phenylene group | $—O(CH_2)_m—$ (m: 1-5) | pyridyl group |

TABLE V

| Diamine compound (b-2) No. | $Y^3$ | $Y^4$ | $Y^5$ | $Y^6$ |
|---|---|---|---|---|
| 79 | —C(=O)—N(H)— | phenylene group | —O— | pyrrolyl group |
| 80 | —C(=O)—N(H)— | phenylene group | —O— | imidazole group |
| 81 | —C(=O)—N(H)— | phenylene group | —O— | pyrazolyl group |
| 82 | —C(=O)—N(H)— | phenylene group | —O— | pyridyl group |
| 83 | —C(=O)—N(H)— | phenylene group | —C(=O)—N(H)— | pyrimidinyl group |
| 84 | —C(=O)—N(H)— | phenylene group | —C(=O)—N(H)— | pyrrolyl group |
| 85 | —C(=O)—N(H)— | phenylene group | —C(=O)—N(H)— | imidazole group |
| 86 | —C(=O)—N(H)— | phenylene group | —C(=O)—N(H)— | pyrazolyl group |
| 87 | —C(=O)—N(H)— | phenylene group | —N(H)—C(=O)— | pyridyl group |
| 88 | —C(=O)—N(H)— | phenylene group | —N(H)—C(=O)— | pyrimidinyl group |
| 89 | —C(=O)—N(H)— | phenylene group | —N(H)—C(=O)— | pyrrolyl group |
| 90 | —C(=O)—N(H)— | phenylene group | —N(H)—C(=O)— | imidazole group |
| 91 | —C(=O)—N(H)— | phenylene group | —C(=O)—O— | pyrazolyl group |
| 92 | —C(=O)—N(H)— | phenylene group | —C(=O)—O— | pyridyl group |

TABLE V-continued

| Diamine compound (b-2) No. | $Y^3$ | $Y^4$ | $Y^5$ | $Y^6$ |
|---|---|---|---|---|
| 93 | $-C(=O)-NH-$ | phenylene group | $-C(=O)-O-$ | pyrimidinyl group |
| 94 | $-C(=O)-NH-$ | phenylene group | $-C(=O)-O-$ | pyrrolyl group |
| 95 | $-C(=O)-NH-$ | phenylene group | $-O-C(=O)-$ | imidazole group |
| 96 | $-C(=O)-NH-$ | phenylene group | $-O-C(=O)-$ | pyrazolyl group |
| 97 | $-C(=O)-NH-$ | phenylene group | $-O-C(=O)-$ | pyridyl group |
| 98 | $-C(=O)-NH-$ | phenylene group | $-O-C(=O)-$ | pyrimidinyl group |
| 99 | $-C(=O)-NH-$ | phenylene group | $-O(CH_2)_m-$ (m: 1-5) | pyrrolyl group |
| 100 | $-C(=O)-NH-$ | phenylene group | $-O(CH_2)_m-$ (m: 1-5) | imidazole group |
| 101 | $-C(=O)-NH-$ | phenylene group | $-O(CH_2)_m-$ (m: 1-5) | pyrazolyl group |
| 102 | $-C(=O)-NH-$ | phenylene group | $-O(CH_2)_m-$ (m: 1-5) | pyridyl group |
| 103 | $-NH-C(=O)-$ | phenylene group | $-O-$ | pyrrolyl group |
| 104 | $-NH-C(=O)-$ | phenylene group | $-O-$ | imidazole group |
| 105 | $-NH-C(=O)-$ | phenylene group | $-O-$ | pyrazolyl group |
| 106 | $-NH-C(=O)-$ | phenylene group | $-O-$ | pyridyl group |
| 107 | $-NH-C(=O)-$ | phenylene group | $-C(=O)-NH-$ | pyrimidinyl group |
| 108 | $-NH-C(=O)-$ | phenylene group | $-C(=O)-NH-$ | pyrrolyl group |
| 109 | $-NH-C(=O)-$ | phenylene group | $-C(=O)-NH-$ | imidazole group |
| 110 | $-NH-C(=O)-$ | phenylene group | $-C(=O)-NH-$ | pyrazolyl group |

TABLE VI

| Diamine compound (b-2) No. | $Y^3$ | $Y^4$ | $Y^5$ | $Y^6$ |
|---|---|---|---|---|
| 111 | $-NH-C(=O)-$ | phenylene group | $-NH-C(=O)-$ | pyridyl group |
| 112 | $-NH-C(=O)-$ | phenylene group | $-NH-C(=O)-$ | pyrimidinyl group |
| 113 | $-NH-C(=O)-$ | phenylene group | $-NH-C(=O)-$ | pyrrolyl group |
| 114 | $-NH-C(=O)-$ | phenylene group | $-NH-C(=O)-$ | imidazole group |
| 115 | $-NH-C(=O)-$ | phenylene group | $-C(=O)-O-$ | pyrazolyl group |
| 116 | $-NH-C(=O)-$ | phenylene group | $-C(=O)-O-$ | pyridyl group |
| 117 | $-NH-C(=O)-$ | phenylene group | $-C(=O)-O-$ | pyrimidinyl group |
| 118 | $-NH-C(=O)-$ | phenylene group | $-C(=O)-O-$ | pyrrolyl group |
| 119 | $-NH-C(=O)-$ | phenylene group | $-O-C(=O)-$ | imidazole group |
| 120 | $-NH-C(=O)-$ | phenylene group | $-O-C(=O)-$ | pyrazolyl group |
| 121 | $-NH-C(=O)-$ | phenylene group | $-O-C(=O)-$ | pyridyl group |
| 122 | $-NH-C(=O)-$ | phenylene group | $-O-C(=O)-$ | pyrimidinyl group |
| 123 | $-NH-C(=O)-$ | phenylene group | $-O(CH_2)_m-$ (m: 1-5) | pyrrolyl group |
| 124 | $-NH-C(=O)-$ | phenylene group | $-O(CH_2)_m-$ (m: 1-5) | imidazole group |
| 125 | $-NH-C(=O)-$ | phenylene group | $-O(CH_2)_m-$ (m: 1-5) | pyrazolyl group |
| 126 | $-NH-C(=O)-$ | phenylene group | $-O(CH_2)_m-$ (m: 1-5) | pyridyl group |

TABLE VII

| Diamine compound (b-2) No. | $Y^3$ | $Y^4$ | $Y^5$ | $Y^6$ |
|---|---|---|---|---|
| 127 | $-CH_2O-$ | phenylene group | $-O-$ | pyrrolyl group |

TABLE VII-continued

| Diamine compound (b-2) No. | $Y^3$ | $Y^4$ | $Y^5$ | $Y^6$ |
|---|---|---|---|---|
| 128 | $-CH_2O-$ | phenylene group | —O— | imidazole group |
| 129 | $-CH_2O-$ | phenylene group | —O— | pyrazolyl group |
| 130 | $-CH_2O-$ | phenylene group | —O— | pyridyl group |
| 131 | $-CH_2O-$ | phenylene group | $-C(=O)-N(H)-$ | pyrimidinyl group |
| 132 | $-CH_2O-$ | phenylene group | $-C(=O)-N(H)-$ | pyrrolyl group |
| 133 | $-CH_2O-$ | phenylene group | $-C(=O)-N(H)-$ | imidazole group |
| 134 | $-CH_2O-$ | phenylene group | $-C(=O)-N(H)-$ | pyrazolyl group |
| 135 | $-CH_2O-$ | phenylene group | $-N(H)-C(=O)-$ | pyridyl group |
| 136 | $-CH_2O-$ | phenylene group | $-N(H)-C(=O)-$ | pyrimidinyl group |
| 137 | $-CH_2O-$ | phenylene group | $-N(H)-C(=O)-$ | pyrrolyl group |
| 138 | $-CH_2O-$ | phenylene group | $-N(H)-C(=O)-$ | imidazole group |
| 139 | $-CH_2O-$ | phenylene group | $-C(=O)-O-$ | pyrazolyl group |
| 140 | $-CH_2O-$ | phenylene group | $-C(=O)-O-$ | pyridyl group |
| 141 | $-CH_2O-$ | phenylene group | $-C(=O)-O-$ | pyrimidinyl group |
| 142 | $-CH_2O-$ | phenylene group | $-C(=O)-O-$ | pyrrolyl group |
| 143 | $-CH_2O-$ | phenylene group | $-O-C(=O)-$ | imidazole group |
| 144 | $-CH_2O-$ | phenylene group | $-O-C(=O)-$ | pyrazolyl group |
| 145 | $-CH_2O-$ | phenylene group | $-O-C(=O)-$ | pyridyl group |
| 146 | $-CH_2O-$ | phenylene group | $-O-C(=O)-$ | pyrimidinyl group |
| 147 | $-CH_2O-$ | phenylene group | $-O(CH_2)_m-$ (m: 1-5) | pyrrolyl group |
| 148 | $-CH_2O-$ | phenylene group | $-O(CH_2)_m-$ (m: 1-5) | imidazole group |
| 149 | $-CH_2O-$ | phenylene group | $-O(CH_2)_m-$ (m: 1-5) | pyrazolyl group |
| 150 | $-CH_2O-$ | phenylene group | $-O(CH_2)_m-$ (m: 1-5) | pyridyl group |
| 151 | $-C(=O)-N(CH_3)-$ | phenylene group | —O— | pyrrolyl group |
| 152 | $-C(=O)-N(CH_3)-$ | phenylene group | —O— | imidazole group |
| 153 | $-C(=O)-N(CH_3)-$ | phenylene group | —O— | pyrazolyl group |
| 154 | $-C(=O)-N(CH_3)-$ | phenylene group | —O— | pyridyl group |
| 155 | $-C(=O)-N(CH_3)-$ | phenylene group | $-C(=O)-N(H)-$ | pyrimidinyl group |

TABLE VIII

| Diamine compound (b-2) No. | $Y^3$ | $Y^4$ | $Y^5$ | $Y^6$ |
|---|---|---|---|---|
| 156 | $-C(=O)-N(CH_3)-$ | phenylene group | $-C(=O)-N(H)-$ | pyrrolyl group |
| 157 | $-C(=O)-N(CH_3)-$ | phenylene group | $-C(=O)-N(H)-$ | imidazole group |
| 158 | $-C(=O)-N(CH_3)-$ | phenylene group | $-C(=O)-N(H)-$ | pyrazolyl group |
| 159 | $-C(=O)-N(CH_3)-$ | phenylene group | $-C(=O)-N(H)-$ | pyridyl group |
| 160 | $-C(=O)-N(CH_3)-$ | phenylene group | $-N(H)-C(=O)-$ | pyrimidinyl group |
| 161 | $-C(=O)-N(CH_3)-$ | phenylene group | $-N(H)-C(=O)-$ | pyrrolyl group |
| 162 | $-C(=O)-N(CH_3)-$ | phenylene group | $-N(H)-C(=O)-$ | imidazole group |
| 163 | $-C(=O)-N(CH_3)-$ | phenylene group | $-N(H)-C(=O)-$ | pyrazolyl group |
| 164 | $-C(=O)-N(CH_3)-$ | phenylene group | $-C(=O)-O-$ | pyridyl group |
| 165 | $-C(=O)-N(CH_3)-$ | phenylene group | $-C(=O)-O-$ | pyrimidinyl group |

TABLE VIII-continued

| Diamine compound (b-2) No. | $Y^3$ | $Y^4$ | $Y^5$ | $Y^6$ |
|---|---|---|---|---|
| 166 | $—C(=O)—N(CH_3)—$ | phenylene group | $—C(=O)—O—$ | pyrrolyl group |
| 167 | $—C(=O)—N(CH_3)—$ | phenylene group | $—C(=O)—O—$ | imidazole group |
| 168 | $—C(=O)—N(CH_3)—$ | phenylene group | $—O—C(=O)—$ | pyrazolyl group |
| 169 | $—C(=O)—N(CH_3)—$ | phenylene group | $—O—C(=O)—$ | pyridyl group |
| 170 | $—C(=O)—N(CH_3)—$ | phenylene group | $—O—C(=O)—$ | pyrimidinyl group |
| 171 | $—C(=O)—N(CH_3)—$ | phenylene group | $—O—C(=O)—$ | pyrrolyl group |
| 172 | $—C(=O)—N(CH_3)—$ | phenylene group | $—O(CH_2)_m—$ (m: 1-5) | imidazole group |
| 173 | $—C(=O)—N(CH_3)—$ | phenylene group | $—O(CH_2)_m—$ (m: 1-5) | pyrazolyl group |
| 174 | $—C(=O)—N(CH_3)—$ | phenylene group | $—O(CH_2)_m—$ (m: 1-5) | pyridyl group |

The method of making the diamine compound (b-2) of the invention is not particularly limited, and can include, for instance, the following method: a dinitro compound represented by formula (2d) is first synthesized, and then the nitro groups are reduced to amino groups under the existence of a catalyst, a solvent, and a hydride.

formula (2d)

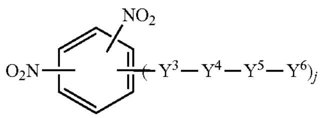

In formula (2d), $Y^3$, $Y^4$, $Y^5$, $Y^6$, and j are respectively defined the same as $Y^3$, $Y^4$, $Y^5$, $Y^6$, and j in formula (2) and are not repeated herein.

Specific examples of the catalyst are not particularly limited, but can include, palladium-carbon, platinum dioxide, raney nickel, platinum black, rhodium-alumina, platinum on activated carbon sulfide, or a combination of the catalysts. Specific examples of the solvent are not particularly limited, but can include ethyl acetate, toluene, tetrahydrofuran, dioxane, alcohol, or a combination of the solvents. Specific examples of the hydride are not particularly limited, but can include hydrogen gas, hydrazine, hydrogen chloride, or a combination of the compounds.

The dinitro compound represented by formula (2d) is synthesized by a method in which $Y^4$ and $Y^6$ are first bonded through $Y^5$, and then $Y^4$ and a benzene ring containing a dinitro group are bonded through $Y^3$. Alternatively, the dinitro compound represented by formula (2d) is synthesized by a method in which a benzene ring containing a dinitro group and $Y^4$ are first bonded through $Y^3$, and then $Y^4$ and $Y^6$ are bonded through $Y^5$.

$Y^3$ is a bonding group such as $—O—$, $—NH—$, $—N(CH_3)—$, $—C(=O)—N(H)—$, $—N(H)—C(=O)—$, $—CH_2O—$, $—O—C(=O)—$, $—C(=O)—N(CH_3)—$, or $—N(CH_3)—C(=O)—$, wherein the bonding groups can be formed by a known organic synthesis method.

For instance, in the case that $Y^3$ is —O— or $—CH_2O—$, the dinitro compound represented by formula (2d) can be obtained by reacting a halogen derivative containing a dinitro group and a hydroxyl derivative containing $Y^4$, $Y^5$, and $Y^6$ under the existence of a base. Alternatively, the dinitro compound represented by formula (2d) can be obtained by reacting a hydroxyl derivative containing a dinitro group and a halogen derivative containing $Y^4$, $Y^5$, and $Y^6$ under the existence of a base.

In the case that $Y^3$ is —NH—, the dinitro compound represented by formula (2d) can be obtained by reacting a halogen derivative containing a dinitro group and an amino group-substituted derivative containing $Y^4$, $Y^5$, and $Y^6$ under the existence of a base.

In the case that $Y^3$ is $—O—C(=O)—$, the dinitro compound represented by formula (2d) can be obtained by reacting a hydroxyl derivative containing a dinitro group and an acid chloride compound containing $Y^4$, $Y^5$, and $Y^6$ under the existence of a base.

In the case that $Y^3$ is $—C(=O)—N(H)—$, the dinitro compound represented by formula (2d) can be obtained by reacting an acid chloride compound containing a dinitro group and an amino group-substituted compound containing $Y^4$, $Y^5$, and $Y^6$ under the existence of a base.

In the case that $Y^3$ is $—N(H)—C(=O)—$, the dinitro compound represented by formula (2d) can be obtained by reacting an amino group-substituted compound and an acid chloride compound containing a dinitro group and containing $Y^4$, $Y^5$, and $Y^6$ under the existence of a base.

Specific examples of the halogen derivative containing a dinitro group and the derivative containing a dinitro group include 3,5-dinitrochlorobenzene, 2,4-dinitrochlorobenzene, 2,4-dinitro fluorobenzene, 3,5-dinitro benzoyl chloride, 3,5-dinitrobenzoic acid, 2,4-dinitrobenzoyl chloride, 2,4-dinitrobenzoic acid, 3,5-dinitro benzyl chloride, 2,4-dinitrobenzyl chloride, 3,5-dinitrobenzyl alcohol, 2,4-dinitrobenzyl alcohol, 2,4-dinitroaniline, 3,5-dinitroaniline, 2,6-dinitroaniline, 2,4-dinitrophenol, 2,5-dinitrophenol, 2,6-dinitrophenol, or 2,4-dinitrophenylacetic acid. The halogen derivative containing a dinitro group and the derivative containing a dinitro group can be used alone or in multiple combinations based on the obtainability and the reactivity of the raw materials.

When the diamine compound (b-2) is not used in the polymer (A) in the liquid crystal alignment agent, the formed liquid crystal alignment film has the issue of poor ultraviolet reliability.

Based on a usage amount of 100 moles of the diamine component (b), the usage amount of the diamine compound (b-2) can be 1 mole to 20 moles, preferably 2 moles to 18 moles, and more preferably 3 moles to 15 moles.

The molar ratio (b-1)/(b-2) of the diamine compound (b-1) and the diamine compound (b-2) can be 0.5 to 10, preferably 1 to 8, and more preferably 2 to 5. When the molar ratio of the diamine compound (b-1) and the diamine compound (b-2) of the polymer (A) in the liquid crystal alignment agent is within the above ranges, the ultraviolet stability of the formed liquid crystal alignment film can be further improved.

Diamine Compound (b-3)

In addition to the diamine compound (b-1) and the diamine compound (b-2), without affecting the efficacy, the diamine compound (b-3) can also be used in the diamine component (b) of the invention. Specific examples of the diamine compound (b-3) include, but are not limited to, 1,2-diaminoethane, 1,3-diaminopropane, 1,4-diaminobutane, 1,5-diaminopentane, 1,6-diaminohexane, 1,7-diaminoheptane, 1,8-diaminooctane, 1,9-diaminononane, 1,10-diaminodecane, 4,4'-diaminoheptane, 1,3-diamino-2,2-dimethylpropane, 1,6-diamino-2,5-dimethylhexane, 1,7-diamino-2,5-dimethylheptane, 1,7-diamino-4,4-dimethylheptane, 1,7-diamino-3-methylheptane, 1,9-diamino-5-methylnonane, 2,11-diaminododecane, 1,12-diaminooctadecane, 1,2-bis(3-aminopropoxy)ethane, 4,4'-diaminodicyclohexylmethane, 4,4'-diamino-3,3'-dimethyldicyclohexylamine, 1,3-diaminocyclohexane, 1,4-diaminocyclohexane, isophorone diamine, tetrahydrodicyclopentadiene diamine, tricyclo $(6.2.1.0^{2,7})$-undecylenedimethyl diamine, 4,4'-methylenebis (cyclohexylamine), 4,4'-diaminodiphenylmethane, 4,4'-diaminodiphenylethane, 4,4'-diaminodiphenylsulfone, 4,4'-diaminobenzanilide, 4,4'-diaminodiphenyl ether, 3,4'-diaminodiphenyl ether, 1,5-diaminonaphthalene, 5-amino-1-(4'-aminophenyl)-1,3,3-trimethyl indane, 6-amino-1-(4'-aminophenye-1,3,3-trimethyl indane, hexahydro-4,7-methanoindanylenedimethylenediamine, 3,3'-diamino benzophenone, 3,4'-diamino benzophenone, 4,4'-diamino benzophenone, 2,2-bis[4-(4-aminophenoxy)phenyl]propane, 2,2-bis[4-(4-aminophenoxyl)phenyl]hexafluoropropane, 2,2-bis(4-aminophenyl)hexafluoropropane, 2,2-bis[4-(4-aminophenoxyl)phenyl]sulfone, 1,4-bis(4-aminophenoxy)benzene, 1,3-bis(4-aminophenoxy)benzene, 1,3-bis(3-aminophenoxy)benzene, 9,9-bis(4-aminophenyl)-10-hydroanthracene, 9,10-bis(4-aminophenyl)anthacene, 2,7-diaminofluorene, 9,9-bis(4-aminophenyl)fluorene, 4,4'-methylene-bis(2-chloroaniline), 4,4'-(p-phenylene isopropylidene)bisaniline, 4,4'-(m-phenylene isopropylidene)bisaniline, 2,2'-bis[4-(4-amino-2-trifluoromethylphenoxy) phenyl]hexafluoropropane, 4,4'-bis[(4-amino-2-trifluoromethyl)phenoxy]-octafluorobiphenyl, 5-[4-(4-n-pentylcyclohexyl)cyclohexyl]phenylmethylene-1,3-diaminobenzene, 1,1-bis[4-(4-aminophenoxyl)phenyl]-4-(4-ethylphenyl)cyclohexane, at least one of the diamine compounds represented by formula (II-1) to formula (II-30), or a combination of the compounds.

The diamine compounds represented by formula (II-1) to formula (II-30) are as shown below.

formula (II-1)

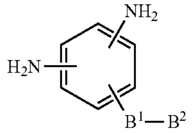

In formula (II-1), $B^1$ represents

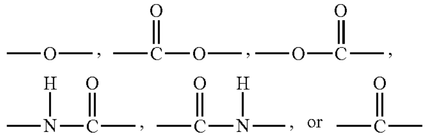

and $B^2$ represents a group having a steroid skeleton, a trifluoromethyl group, a fluorine group, a $C_2$ to $C_{30}$ alkyl group, or a monovalent group of a cyclic structure containing a nitrogen atom derived from, for instance, pyridine, pyrimidine, triazine, piperidine, or piperazine.

Specific examples of the compound represented by formula (II-1) include, but are not limited to, 2,4-diaminophenyl ethyl formate, 3,5-diaminophenyl ethyl formate, 2,4-diaminophenyl propyl formate, 3,5-diaminophenyl propyl formate, 1-dodecoxy-2,4-diaminobenzene, 1-hexadecoxy-2,4-diaminobenzene, 1-octadecoxy-2,4-diaminobenzene, at least one of the compounds represented by formula (II-1-1) to formula (II-1-6), or a combination of the compounds.

The compounds represented by formula (II-1-1) to formula (II-1-6) are as shown below.

formula (II-1-1)

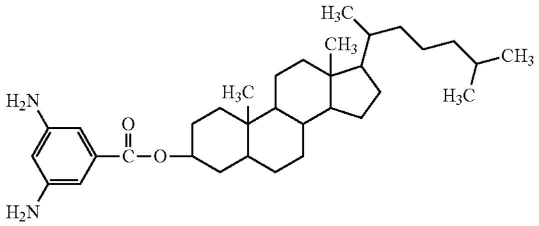

formula (II-1-2)

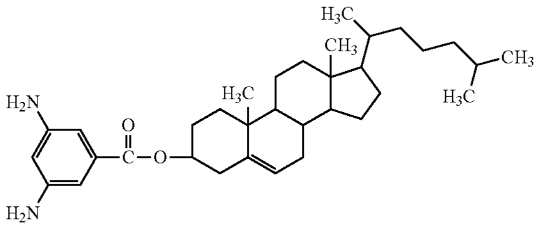

-continued formula (II-1-3)

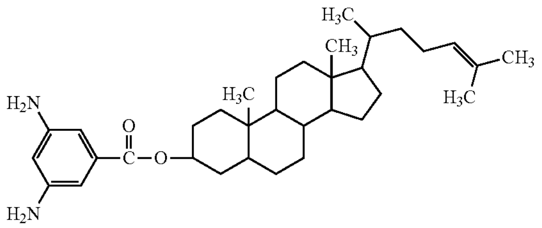

formula (II-1-4)

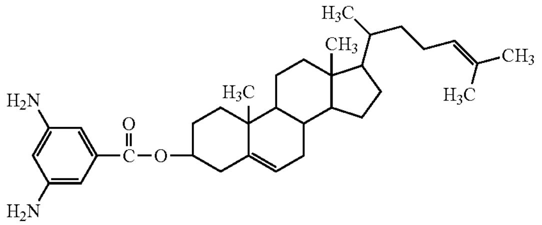

formula (II-1-5)

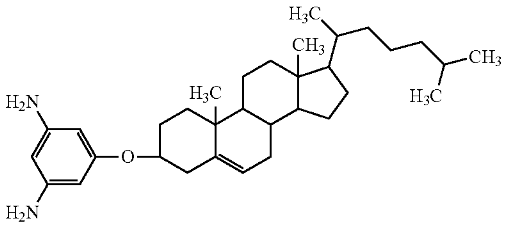

formula (II-1-6)

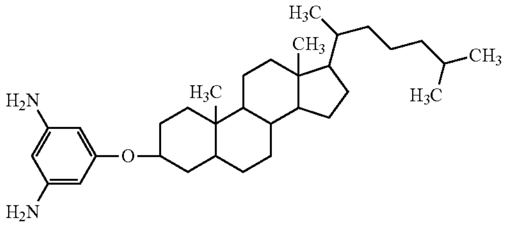

formula (II-2)

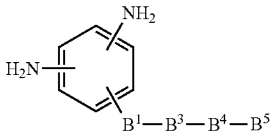

In formula (II-2), $B^1$ is the same as the $B^1$ in formula (II-1), $B^3$ and $B^4$ each independently represent a divalent aliphatic ring, a divalent aromatic ring, or a divalent heterocyclic group; $B^5$ represents a $C_3$ to $C_{18}$ alkyl group, a $C_3$ to $C_{18}$ alkoxy group, a $C_1$ to $C_5$ fluoroalkyl group, a $C_1$ to $C_5$ fluoroalkyloxy group, a cyano group, or a halogen atom.

Specific examples of the compound represented by formula (II-2) include at least one of the compounds represented by formula (II-2-1) to formula (II-2-13). Specifically, the compounds represented by formula (II-2-1) to formula (II-2-13) are as follows.

formula (II-2-1)

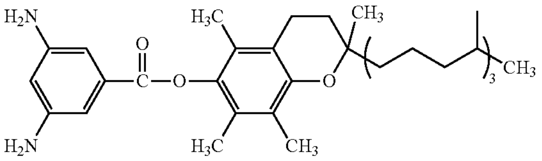

formula (II-2-2)

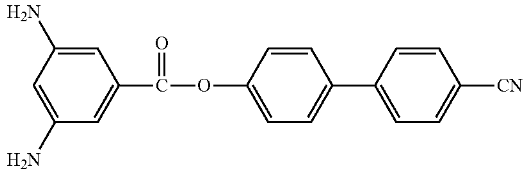

formula (II-2-3)

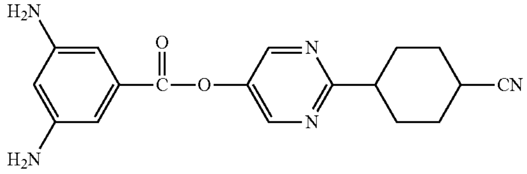

formula (II-2-4)

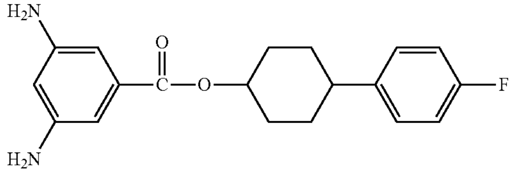

formula (II-2-5)

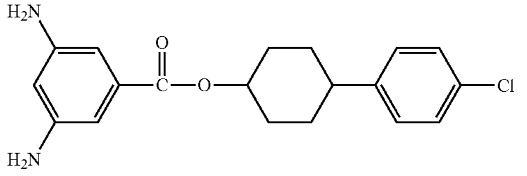

formula (II-2-6)

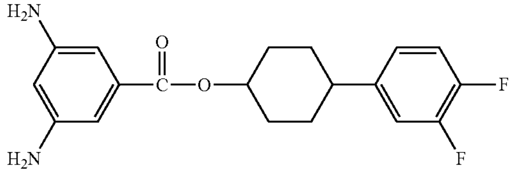

formula (II-2-7)

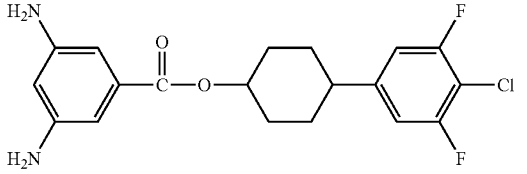

formula (II-2-8)

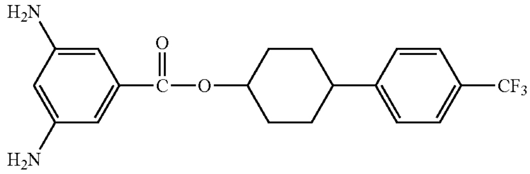

-continued formula (II-2-9)

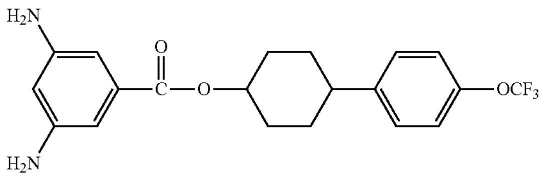

formula (II-2-10)

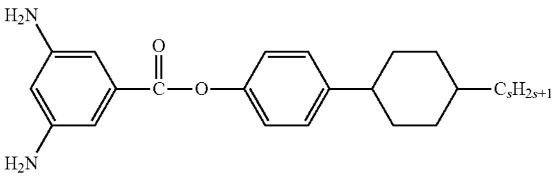

formula (II-2-11)

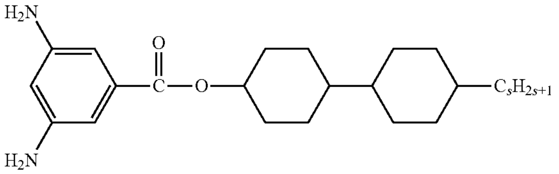

formula (II-2-12)

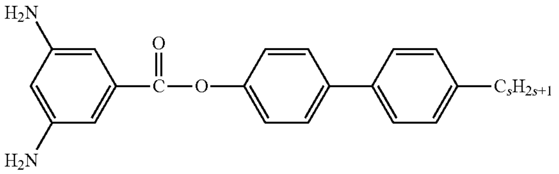

formula (II-2-13)

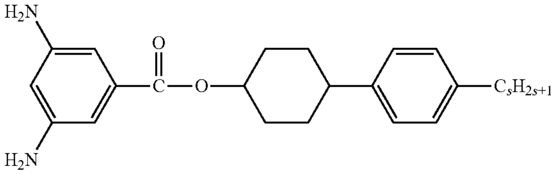

In formula (II-2-10) to formula (II-2-13), s represents an integer of 3 to 12.

formula (II-3)

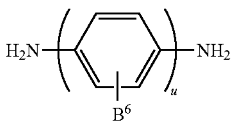

In formula (II-3), $B^6$ each independently represents a hydrogen atom, a $C_1$ to $C_5$ acyl group, a $C_1$ to $C_5$ alkyl group, a $C_1$ to $C_5$ alkoxy group, or a halogen atom, and $B^6$ in each repeating unit can be the same or different; and u represents an integer of 1 to 3.

Specific examples of the compound represented by formula (II-3) include: (1) when u is 1: p-diaminobenzene, m-diaminobenzene, o-diaminobenzene, or 2,5-diaminotoluene . . . etc.; (2) when u is 2: 4,4'-diaminobiphenyl, 2,2'-dimethyl-4,4'-diaminobiphenyl, 3,3'-dimethyl-4,4'-diaminobiphenyl, 3,3'-dimethoxy-4,4'-diaminobiphenyl, 2,2'-dichloro-4,4'-diaminobiphenyl, 3,3'-dichloro-4,4'-diaminobiphenyl, 2,2',5,5'-tetrachloro-4,4' diaminobiphenyl, 2,2'-dichloro-4,4'-diamino-5,5'-dimethoxybiphenyl, or 4,4'-diamino-2,2'-bis(trifluoromethyl)biphenyl . . . etc.; or (3) when u is 3: 1,4-bis(4'-aminophenyl)benzene . . . etc.

Specific examples of the compound represented by formula (II-3) preferably include p-diaminobenzene, 2,5-diaminotoluene, 4,4'-diaminobiphenyl, 3,3'-dimethoxy-4,4'-diaminobiphenyl, 1,4-bis(4'-aminophenyl)benzene, or a combination of the compounds.

formula (II-4)

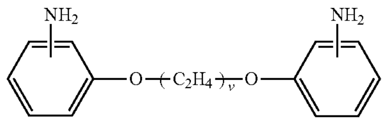

In formula (II-4), v represents an integer of 2 to 12.

formula (II-5)

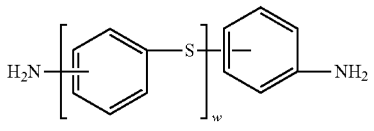

In formula (5), w represents an integer of 1 to 5. The compound represented by formula (II-5) is preferably 4,4'-diamino-diphenyl sulfide.

formula (II-6)

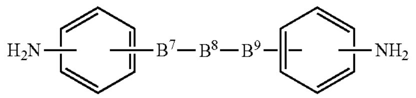

In formula (II-6), $B^7$ and $B^9$ each independently represent a divalent organic group, and $B^7$ and $B^9$ can be the same or different; $B^8$ represents a divalent group of a cyclic structure containing a nitrogen atom derived from, for instance, pyridine, pyrimidine, triazine, piperidine, or piperazine.

formula (II-7)

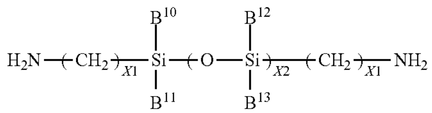

In formula (II 7), $B^{10}$, $B^{11}$, $B^{12}$, and $B^{13}$ each independently represent a $C_1$ to $C_{12}$ hydrocarbon group, and $B^{10}$, $B^{11}$, $B^{12}$, and $B^{13}$ can be the same or different; X1 each independently represents an integer of 1 to 3; and X2 represents an integer of 1 to 20.

formula (II-8)

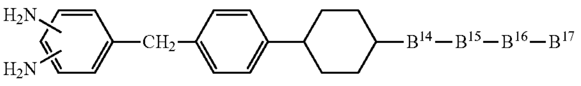

In formula (II-8), $B^{14}$ represents an oxygen atom or a cyclohexylene group; $B^{15}$ represents a methylene group (—$CH_2$); $B^{16}$ represents a phenylene group or a cyclohexylene group; and $B^{17}$ represents a hydrogen atom or a heptyl group.

Specific examples of the compound represented by formula (II-8) include a compound represented by formula (II-8-1), a compound represented by formula (II-8-2), or a combination of the compounds.

formula (II-8-1)

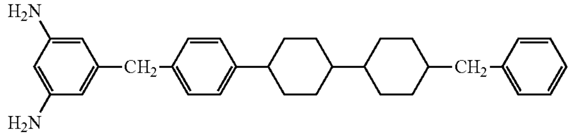

formula (II-8-2)

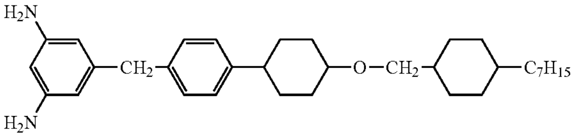

The compounds represented by formula (II-9) to formula (II-30) are as shown below.

formula (II-9)

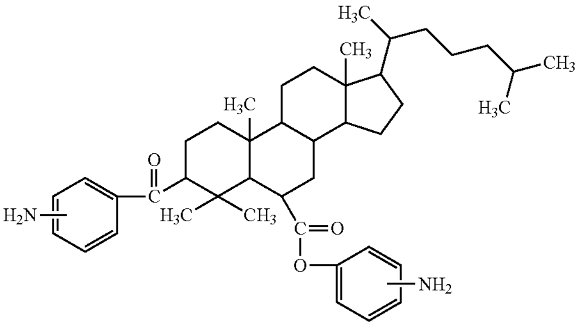

formula (II-10)

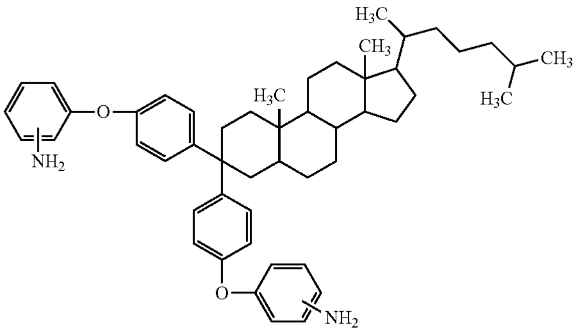

formula (II-11)

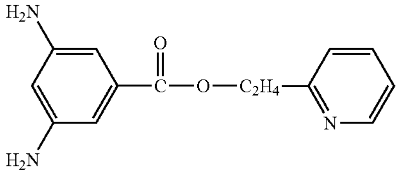

-continued formula (II-12)

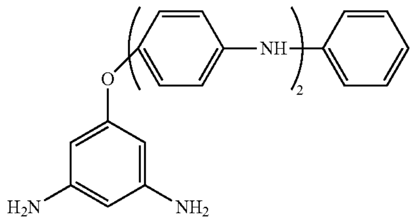

formula (II-13)

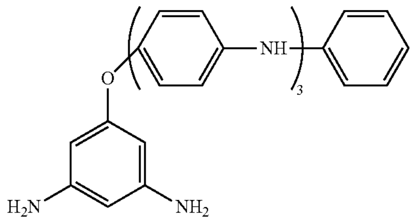

formula (II-14)

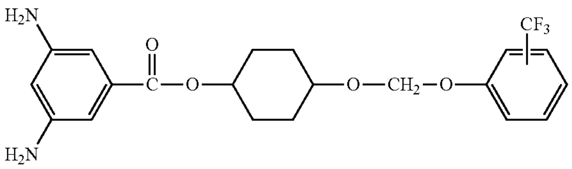

formula (II-15)

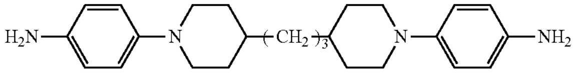

formula (II-16)

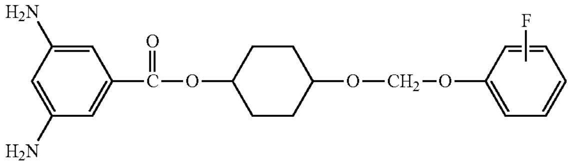

formula (II-17)

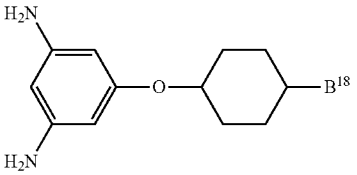

formula (II-18)

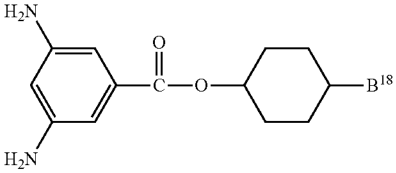

formula (II-19)

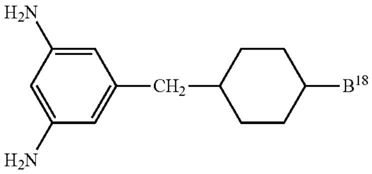

-continued formula (II-20

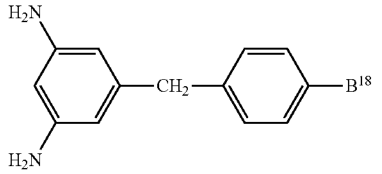

formula (II-21)

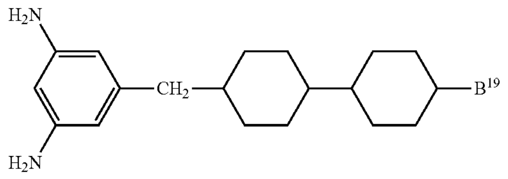

formula (II-22)

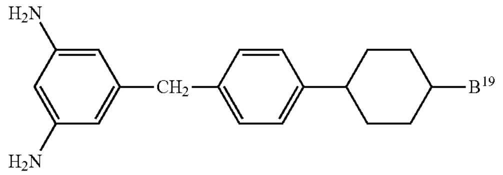

formula (II-23)

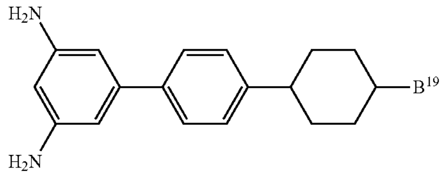

formula (II-24)

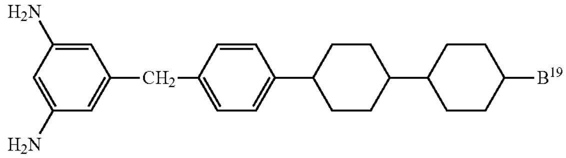

formula (II-25)

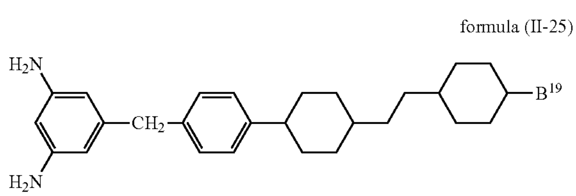

formula (II-26)

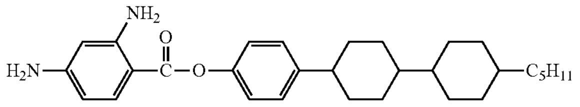

formula (II-27)

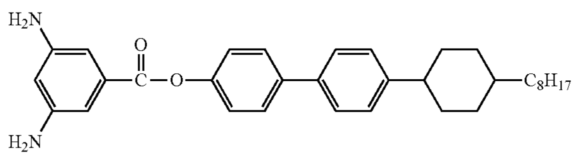

-continued formula (II-28)

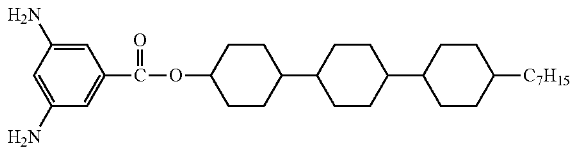

formula (II-29)

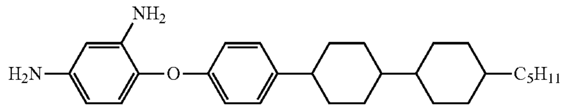

formula (II-30)

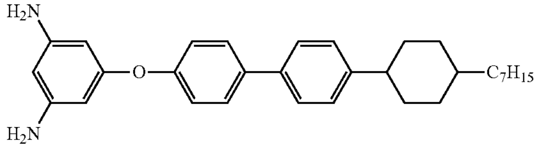

In formula (II-17) to formula (II-25), $B^{18}$ preferably represents a $C_1$ to $C_{10}$ alkyl group or a $C_1$ to $C_{10}$ alkoxy group; and $B^{19}$ preferably represents a hydrogen atom, a $C_1$ to $C_{10}$ alkyl group, or a $C_1$ to $C_{10}$ alkoxy group.

Specific examples of the diamine compound (b-3) preferably include, but are not limited to, 1,2-diaminoethane, 4,4'-diaminodicyclohexylmethane, 4,4'-diaminodiphenyl methane, 4,4'-diaminodiphenyl ether, 5-[4-(4-n-pentylcyclohexyl)cyclohexyl]phenylmethylene-1,3-diaminobenzene, 1,1-bis[4-(4-aminophenoxyl)phenyl]-4-(4-ethylphenyl)cyclohexane, 2,4-diaminophenyl ethyl formate, a compound represented by formula (II-1-1), a compound represented by formula (II-1-2), a compound represented by formula (II-1-5), a compound represented by formula (II-2-1), a compound represented by formula (II-2-11), p-diaminobenzene, m-diaminobenzene, o-diaminobenzene, a compound represented by formula (II-8-1), a compound represented by formula (II-26), a compound represented by formula (II-29), or a combination of the compounds.

The diamine compound (b-3) can be used alone or in multiple combinations.

In the diamine compound (b-3), when at least one of the diamine compounds represented by formula (II-2) and formula (II-26) to formula (II-30) is used in the polymer (A) in the liquid crystal alignment agent, the ultraviolet reliability of the formed liquid crystal alignment film is particularly good.

Based on a total number of moles of 100 moles of the diamine component (b), the usage amount of the diamine compound (b-3) can be 30 moles to 94 moles, preferably 42 moles to 90 moles, and more preferably 55 moles to 87 moles.

Method of Preparing Polymer (A)

The polymer (A) can include at least one of polyamic acid and polyimide. Moreover, the polymer (A) can further include a polyimide-based block copolymer. The preparation method of each of the various polymers above is further described below.

Method of Preparing Polyamic Acid

The method of preparing the polyamic acid includes first dissolving a mixture in a solvent, wherein the mixture includes the tetracarboxylic dianhydride component (a) and the diamine component (b). A polycondensation reaction is then performed at a temperature of 0° C. to 100° C. After reacting for 1 hour to 24 hours, the reaction solution is distilled under reduced pressure with an evaporator to obtain the polyamic acid. Alternatively, the reaction solution is poured into a large amount of a poor solvent to obtain a precipitate, and then the precipitate is dried with a method of drying under reduced pressure to obtain the polyamic acid. In the mixture, based on a total usage amount of 100 moles of the diamine component (b), the usage amount of the tetracarboxylic dianhydride component (a) is preferably 20 moles to 200 moles, more preferably 30 moles to 120 moles.

The solvent used in the polycondensation reaction can be the same or different as the solvent in the liquid crystal alignment agent below, and the solvent used in the polycondensation reaction is not particularly limited, provided the solvent can dissolve the reactants and the products. The solvent preferably includes, but is not limited to (1) an aprotic polar solvent such as N-methyl-2-pyrrolidinone (NMP), N,N-dimethyl acetamide, N,N-dimethyl formamide, dimethyl sulfoxide, γ-butyrolactone, tetramethylurea, or hexamethylphosphor amide; or (2) a phenolic solvent such as m-cresol, xylenol, phenol, or halogenated phenol. Based on a total usage amount of 100 parts by weight of the mixture, the usage amount of the solvent used in the polycondensation reaction is preferably 200 parts by weight to 2000 parts by weight, more preferably 300 parts by weight to 1800 parts by weight.

It should be mentioned that, in the polycondensation reaction, the solvent can be used with a suitable amount of a poor solvent, wherein the poor solvent does not cause precipitation of the polyamic acid. The poor solvent can be used alone or in multiple combinations, and includes, but is not limited to (1) an alcohol such as methanol, ethanol, isopropanol, cyclohexanol, ethylene glycol, propylene glycol, 1,4-butanediol, or triglycol; (2) a ketone such as acetone, methyl ethyl ketone, methyl isobutyl ketone, or cyclohexanone; (3) an ester such as methyl acetate, ethyl acetate, butyl acetate, diethyl oxalate, diethyl malonate, or ethylene glycol monoethyl ether acetate; (4) an ether such as diethyl ether, ethylene glycol monomethyl ether, ethylene glycol monoethyl ether, ethylene glycol n-propyl ether, ethylene glycol isopropyl ether, ethylene glycol n-butyl ether, ethylene glycol dimethyl ether, or diethylene glycol dimethyl ether; (5) a halogenated hydrocarbon such as dichloromethane, 1,2-dichloroethane, 1,4-dichlorobutane, trichloro ethane, chlorobenzene, or o-dichlorobenzene; or (6) a hydrocarbon such as tetrahydrofuran, hexane, heptane, octane, benzene, toluene, or xylene, or any combination of the solvents. Based on a usage amount of 100 parts by weight of the diamine component (b), the usage amount of the poor solvent is preferably 0 parts by weight to 60 parts by weight, more preferably 0 parts by weight to 50 parts by weight.

Method of Preparing Polyimide

The method of preparing the polyimide includes heating the polyamic acid obtained by the above method of preparing polyamic acid under the existence of a dehydrating agent and a catalyst. During the heating process, the amic acid functional group in the polyamic acid can be converted into an imide functional group through a dehydration ring-closure reaction (i.e., imidization).

The solvent used in the dehydration ring-closure reaction can be the same as the solvent (B) in the liquid crystal alignment agent and is therefore not repeated herein. Based on a usage amount of 100 parts by weight of the polyamic acid, the usage amount of the solvent used in the dehydration ring-closure reaction is preferably 200 parts by weight to 2000 parts by weight, more preferably 300 parts by weight to 1800 parts by weight.

To obtain a preferable degree of imidization of the polyamic acid, the operating temperature of the dehydration ring-closure reaction is preferably 40° C. to 200° C. more preferably 40° C. to 150° C. If the operating temperature of the dehydration ring-closure reaction is less than 40° C., then the imidization reaction is incomplete, and the degree of imidization of the polyamic acid is thereby reduced. However, if the operating temperature of the dehydration ring-closure reaction is higher than 200° C., then the weight-average molecular weight of the obtained polyimide is lower.

The dehydrating agent used in the dehydration ring-closure reaction can be selected from an anhydride compound, and specific examples thereof include, for instance, acetic anhydride, propionic anhydride, or trifluoroacetic anhydride. Based on 1 mole of polyamic acid, the usage amount of the dehydrating agent is 0.01 moles to 20 moles. The catalyst used in the dehydration ring-closure reaction can be selected from (1) a pyridine compound such as pyridine, trimethyl pyridine, or dimethyl pyridine; or (2) a tertiary amine compound such as triethylamine. Based on a usage amount of 1 mole of the dehydrating agent, the usage amount of the catalyst can be 0.5 moles to 10 moles.

The imidization ratio of the polymer (A) can be 30% to 90%, preferably 35% to 85%, and more preferably 40% to 80%. When the imidization ratio of the polymer (A) in the liquid crystal alignment agent is within the above ranges, the ultraviolet reliability of the formed liquid crystal alignment film can further be improved.

Method of Preparing Polyimide-Based Block Copolymer

The polyimide-based block copolymer is selected from a polyamic acid block copolymer, a polyimide block copolymer, a polyamic acid-polyimide block copolymer, or any combination of the polymers.

The method of preparing the polyimide-based block copolymer preferably includes first dissolving a starting material in a solvent and then performing a polycondensation reaction, wherein the starting material includes at least one type of polyamic acid and/or at least one type of polyimide, and can further include a carboxylic anhydride component and a diamine component.

The carboxylic anhydride component and the diamine component in the starting material can be the same as the tetracarboxylic dianhydride component (a) and the diamine component (b) used in the method of preparing the polyamic acid. Moreover, the solvent used in the polycondensation reaction can be the same as the solvent in the liquid crystal alignment agent below and is not repeated herein.

Based on a usage amount of 100 parts by weight of the starting material, the usage amount of the solvent used in the polycondensation reaction is preferably 200 parts by weight to 2000 parts by weight, more preferably 300 parts by weight to 1800 parts by weight. The operating temperature of the polycondensation reaction is preferably 0° C. to 200° C., more preferably 0° C. to 100° C.

The starting material preferably includes, but is not limited to (1) two polyamic acids for which the terminal groups are different and the structures are different; (2) two polyimides for which the terminal groups are different and the structures are different; (3) a polyamic acid and a polyimide for which the terminal groups are different and the structures are different; (4) a polyamic acid, a carboxylic anhydride component, and a diamine component, wherein the structure of at least one of the carboxylic anhydride component and the diamine component is different from the structures of the carboxylic anhydride component and the diamine component used to form the polyamic acid; (5) a polyimide, a carboxylic anhydride component, and a diamine component, wherein the structure of at least one of the carboxylic anhydride component and the diamine component is different from the structures of the carboxylic anhydride component and the diamine component used to form the polyimide; (6) a polyamic acid, a polyimide, a carboxylic anhydride component, and a diamine component, wherein the structure of at least one of the carboxylic anhydride component and the diamine component is different from the structures of the carboxylic anhydride component and the diamine component used to form the polyamic acid or the polyimide; (7) two polyamic acids having different structures, a carboxylic anhydride component, and a diamine component; (8) two polyimides having different structures, a carboxylic anhydride component, and a diamine component; (9) two polyamic acids having anhydride groups as terminal groups and having different structures, and a diamine component; (10) two polyamic acids having amine groups as terminal groups and having different structures, and a carboxylic anhydride component; (11) two polyimides having anhydride groups as terminal groups and having different structures, and a diamine component; or (12) two polyimides having amine groups as terminal groups and having different structures, and a carboxylic anhydride component.

Without affecting the efficacy of the invention, the polyamic acid, the polyimide, and the polyimide-based block copolymer are preferably terminal-modified polymers in which molecular weight regulation is first performed. By using the terminal-modified polymers, the coating performance of the liquid crystal alignment agent can be improved. The method of preparing the terminal-modified polymers can include adding a monofunctional compound at the same time a polycondensation reaction is performed on the polyamic acid.

Specific examples of the monofunctional compound include, but are not limited to, (1) a monoanhydride such as maleic anhydride, phthalic anhydride, itaconic anhydride, n-decyl succinic anhydride, n-dodecyl succinic anhydride, n-tetradecyl succinic anhydride, or n-hexadecyl succinic anhydride; (2) a monoamine compound such as aniline, cyclohexylamine, n-butylamine, n-amylamine, n-hexylamine, n-heptylamine, n-octylamine, n-nonylamine, n-decylamine, n-undecylamine, n-dodecyl amine, n-tridecylamine, n-tetradecyl amine, n-pentadecylamine, n-hexadecylamine, n-heptadecylamine, n-octadecylamine, or n-eicosylamine; or (3) a monoisocyanate compound such as phenyl isocyanate or naphthyl isocyanate.

Solvent (B)

Specific examples of the solvent (B) include, but are not limited to, for instance, N-methyl-2-pyrrolidone (NMP), γ-butyrolactone, γ-butyrolactam, 4-hydroxy-4-methyl-2-pentanone, ethylene glycol monomethyl ether, butyl lactate, butyl acetate, methyl methoxypropionate, ethyl ethoxypropionate, ethylene glycol monomethyl ether, ethylene glycol monoethyl ether, ethylene glycol n-propyl ether, ethylene glycol isopropyl ether, ethylene glycol n-butyl ether, ethylene glycol dimethyl ether, ethylene glycol ethyl ether acetate, diethylene glycol dimethyl ether, diethylene glycol diethyl ether, diethylene glycol monomethyl ether, diethylene glycol monoethyl ether, diethylene glycol monomethyl ether acetate, diethylene glycol monoethyl ether acetate, N,N-dimethyl formamide, or N,N-dimethyl acetamide. The solvent (B) can be used alone or in multiple combinations.

Based on a usage amount of 100 parts by weight of the polymer (A), the usage amount of the solvent (B) is 500 parts by weight to 3000 parts by weight, preferably 800 parts by weight to 2500 parts by weight, and more preferably 1000 parts by weight to 2000 parts by weight. When the usage amount of the solvent (B) in the liquid crystal alignment agent is within the above ranges, the printability of the liquid crystal alignment agent can further be improved.

Additive (C)

Without affecting the efficacy of the invention, an additive (C) can further optionally be added to the liquid crystal alignment agent, wherein the additive (C) includes a compound having at least two epoxy groups, a silane compound having a functional group, or a combination thereof.

The compound having at least two epoxy groups includes, but is not limited to, ethylene glycol diglycidyl ether, polyethylene glycol diglycidyl ether, propylene glycol diglycidyl ether, tripropylene glycol diglycidyl ether, polypropylene glycol diglycidyl ether, neopentyl glycol diglycidyl ether, 1,6-hexanediol diglycidyl ether, glycerol diglycidyl ether, 2,2-dibromo-neopentyl glycol diglycidyl ether, 1,3,5,6-tetraglycidyl-2,4-hexanediol, N,N,N',N'-tetraglycidyl-m-xylenediamine, 1,3-bis(N,N-diglycidylaminomethyl)cyclohexane, N,N,N',N'-tetraglycidyl-4,4'-diaminodiphenylmethane, N,N-glycidyl-p-glycidyloxy aniline, 3-(N-allyl-N-glycidyl)aminopropyltrimethoxysilane, 3-(N,N-diglycidyl)aminopropyltrimethoxysilane, or a combination of the compounds.

The compound having at least two epoxy groups can be used alone or in multiple combinations.

Based on a usage amount of 100 parts by weight of the polymer (A), the usage amount of the compound having at least two epoxy groups can be 0 parts by weight to 40 parts by weight, preferably 0.1 parts by weight to 30 parts by weight.

Specific examples of the silane compound having a functional group include, but are not limited to, 3-aminopropyltrimethoxysilane, 3-aminopropyltriethoxysilane, 2-aminopropyltrimethoxysilane, 2-aminopropyltriethoxysilane, N-(2-aminoethyl)-3-aminopropyltrimethoxysilane, N-(2-aminoethyl)-3-aminopropyldimethoxysilane, 3-ureidopropyltrimethoxysilane, 3-ureidopropyltriethoxysilane, N-ethoxycarbonyl-3-aminopropyltrimethoxysilane, N-ethoxycarbonyl-3-aminopropyltriethoxysilane, N-triethoxysilylpropyltriethylenetriamine, N-trimethoxysilylpropyltriethylenetriamine, 10-trimethoxysilyl-1,4,7-triazadecane, 10-triethoxysilyl-1,4,7-triazadecane, 9-trimethoxysilyl-3,6-diazanonylacetate, 9-triethoxysilyl-3,6-diazanonylacetate, N-benzyl-3-aminopropyl-trimethoxysilane, N-benzyl-3-aminopropyltriethoxysilane, N-phenyl-3-aminopropyl-trimethoxysilane, N-phenyl-3-aminopropyltriethoxysilane, N-bis(oxyethylene)-3-aminopropyltrimethoxysilane, N-bis(oxyethylene)-3-aminopropyltriethoxysilane, or a combination of the compounds. The additive (C) can be used alone or in multiple combinations.

Based on a usage amount of 100 parts by weight of the polymer (A), the usage amount of the silane compound having a functional group can be 0 parts by weight to 10 parts by weight, preferably 0.5 parts by weight to 10 parts by weight.

Based on a total usage amount of 100 parts by weight of the polymer (A), the usage amount of the additive (C) is preferably 0.5 parts by weight to 50 parts by weight, more preferably 1 part by weight to 45 parts by weight.

<Preparation Method of Liquid Crystal Alignment Agent>

The preparation method of the liquid crystal alignment agent is not particularly limited, and a general mixing method can be used for the preparation. For instance, the polymer (A) is first added to the solvent (B) at a temperature of 0° C. to 200° C., and the additive (C) is optionally added. Next, the mixture is continuously stirred by using a stirring apparatus until the mixture is dissolved. Moreover, the polymer (A) is preferably added to the solvent (B) at a temperature of 20° C. to 60° C.

<Preparation Method of Liquid Crystal Alignment Film>

The liquid crystal alignment film of the invention can be formed by the above liquid crystal alignment agent.

Specifically, the preparation method of the liquid crystal alignment film can include, for instance: coating the liquid crystal alignment agent on the surface of a substrate with a method such as a roll coating method, a spin coating method, a printing method, or an ink-jet method to form a pre-coat layer. Then, a pre-bake treatment, a post-bake treatment, and an alignment treatment are performed on the pre-coat layer to obtain a substrate on which a liquid crystal alignment film is formed.

The purpose of the pre-bake treatment is to volatilize the organic solvent in the pre-coat layer. The operating temperature of the pre-bake treatment is preferably 30° C. to 120° C., more preferably 40° C. to 110° C., and even more preferably 50° C. to 100° C.

The alignment treatment is not particularly limited, and can include wrapping a cloth made from a fiber such as nylon, rayon, or cotton on a roller and performing alignment by rubbing in a certain direction.

The purpose of the post-bake treatment is to further perform a dehydration ring closure (imidization) reaction on the polymer in the pre-coat layer. The operating temperature of the post-bake treatment is preferably 150° C. to 300° C., more preferably 180° C. to 280° C., and even more preferably 200° C. to 250° C.

<Liquid Crystal Display Element and Preparation Method Thereof>

The liquid crystal display element of the invention includes the liquid crystal alignment film formed by the liquid crystal alignment agent of the invention.

The liquid crystal display element of the invention can be made according to the following method.

Two substrates on which a liquid crystal alignment film is formed are prepared, and a liquid crystal is disposed between the two substrates to make a liquid crystal cell. To make the liquid crystal cell, the following two methods can be provided.

The first method includes first disposing the two substrates opposite to each other with a gap (cell gap) in between such that each liquid crystal alignment film is opposite to one another. Then, the peripherals of the two substrates are laminated together with a sealant. Next, liquid crystal is injected into the cell gap divided by the substrate surfaces and the sealant, and then the injection hole is sealed to obtain the liquid crystal cell.

The second method is called ODF (one drop fill, instillation). First, an ultraviolet curing sealing material for instance is coated on a predetermined portion on one of the two substrates forming the liquid crystal alignment films. Then, liquid crystal is dropped onto the liquid crystal alignment film, and then the other substrate is laminated such that the liquid crystal alignment films are opposite to each other. Next, ultraviolet is irradiated on the entire substrate surface such that the sealant is cured. The liquid crystal cell can thus be made.

When any one of the above methods is used, preferably, after the liquid crystal cell is next heated to the temperature at which the liquid crystal used is in an isotropic phase, the liquid crystal cell is slowly cooled to room temperature to remove flow alignment when the liquid crystal is filled.

Next, by laminating a polarizer on the outer surface of the liquid crystal cell, the liquid crystal display element of the invention can be obtained.

Specific examples of the sealant include, for instance, an alumina ball used as a spacer and an epoxy resin used as a curing agent.

The polarizer used on the outside of the liquid crystal cell can include, for instance, a polarizer formed by a polarizing film known as "H film" obtained when iodine is absorbed at the same time that polyvinyl alcohol is stretch aligned by clamping with a cellulose acetate protective film, or a polarizer formed by the "H film" itself.

The liquid crystal display element of the invention thus made has excellent display performance, and even after prolonged use, the display performance is not worsened.

FIG. 1 is a side view of a liquid crystal display element according to an embodiment of the invention. A liquid crystal display element 100 includes a first unit 110, a second unit 120, and a liquid crystal unit 130, wherein the second unit 120 and the first unit 110 are separately disposed and the liquid crystal unit 130 is disposed between the first unit 110 and the second unit 120.

The first unit 110 includes a first substrate 112, a first conductive film 114, and a first liquid crystal alignment film 116, wherein the first conductive film 114 is located between the first substrate 112 and the first liquid crystal alignment film 116, and the first liquid crystal alignment film 116 is located on one side of the liquid crystal unit 130.

The second unit 120 includes a second substrate 122, a second conductive film 124, and a second liquid crystal alignment film 126, wherein the second conductive film 124 is located between the second substrate 122 and the second liquid crystal alignment film 126, and the second liquid crystal alignment film 126 is located on another side of the liquid crystal unit 130. In other words, the liquid crystal unit 130 is located between the first liquid crystal alignment film 116 and the second liquid crystal alignment film 126.

The first substrate 112 and the second substrate 122 are selected from, for instance, a transparent material, wherein the transparent material includes, but is not limited to, for instance, alkali-free glass, soda-lime glass, hard glass (Pyrex glass), quartz glass, polyethylene terephthalate, polybutylene terephthalate, polyethersulfone, or polycarbonate for a liquid crystal display apparatus. The material of each of the first conductive film 114 and the second conductive film 124 is selected from, for instance, tin oxide ($SnO_2$) or indium oxide-tin oxide ($In_2O_3$—$SnO_2$).

The first liquid crystal alignment film 116 and the second liquid crystal alignment film 126 are respectively the above liquid crystal alignment films, and the function thereof is to make the liquid crystal unit 130 form a pretilt angle. Moreover, when a voltage is applied to the first conductive film 114 and the second conductive film 124, an electric field can be generated between the first conductive film 114 and the second conductive film 124. The electric field can drive the liquid crystal unit 130, thereby causing change to the arrangement of the liquid crystal molecules in the liquid crystal unit 130. The liquid crystal used in the liquid crystal unit 130 can be used alone or as a mixture, and the liquid crystal includes, but is not limited to, for instance, a diaminobenzene-based liquid crystal, a pyridazine-based liquid crystal, a Schiff base-based liquid crystal, an azoxy-based liquid crystal, a biphenyl-based liquid crystal, a phenylcyclohexane-based liquid crystal, an ester-based liquid crystal, a terphenyl-based liquid crystal, a biphenylcyclohexane-based liquid crystal, a pyrimidine-based liquid crystal, a dioxane-based liquid crystal, a bicyclooctane-based liquid crystal, or a cubane-based liquid crystal. Moreover, a cholesterol-type liquid crystal such as cholesteryl chloride, cholesteryl nonanoate, or cholesteryl carbonate, a chiral agent such as C-15 or CB-15 (made by Merck & Co.), or a ferroelectric-based liquid crystal such as p-decyloxybenzylidene-p-amino-2-methylbutyl cinnamate can further be added as needed.

PREPARATION EXAMPLES OF DIAMINE COMPOUND (b-2)

Preparation example 1 to preparation example 6 of the diamine compound (b-2) are described below:

Preparation Example 1

The compound represented by formula (b-2-1) (diamine compound (b-2-1) hereinafter) was synthesized according to the following synthesis pathway 1.

Synthesis pathway 1

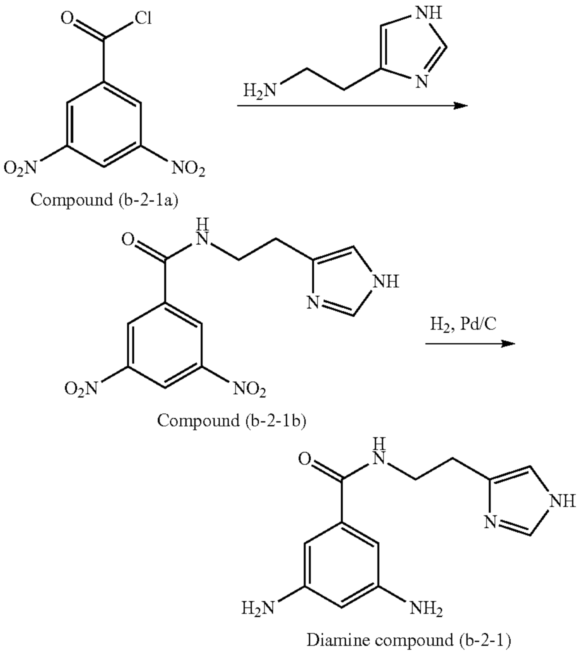

(1) Synthesis of Compound (b-2-1b)

300 g of a tetrahydrofuran solution containing 34.67 g (277 mmol) of 4-aminoethyl-1H-imidazole and 28.03 g (277 mmol) of triethylamine was cooled to 10° C. or less, and 160 g of a tetrahydrofuran solution containing 60.76 g (263 mmol) of 3,5-dinitro benzoyl chloride (compound (b-2-1a)) was added dropwise thereto while noting heat generation. After the dropwise addition was complete, the reaction temperature was raised to 23° C. and the reaction was continued. Next, after the completion of the reaction was confirmed with high-performance liquid chromatography (HPLC), the reaction solution was poured into 2 L of distilled water, and the precipitated solid was filtered. Then, after washing with water, the solid was washed with 400 g of ethanol through dispersion, thereby obtaining a compound (b-2-1b).

(2) Synthesis of Diamine Compound (b-2-1)

Under the existence of hydrogen gas, a mixture of 72.60 g (238 mmol) of the obtained compound (b-2-1b), 5% of palladium-carbon (aqueous type, 7.2 g, 10 wt %), and 710 g of 1,4-dioxane was stirred at 60° C. After the reaction was complete, the catalyst was filtered with celite and the solvent was distilled with an evaporator. Lastly, after washing with 350 g of ethanol by dispersion, a diamine compound (b-2-1) was obtained.

Preparation Example 2

The compound represented by formula (b-2-2) (diamine compound (b-2-2) hereinafter) was synthesized according to the following synthesis pathway 2.

Synthesis pathway 2

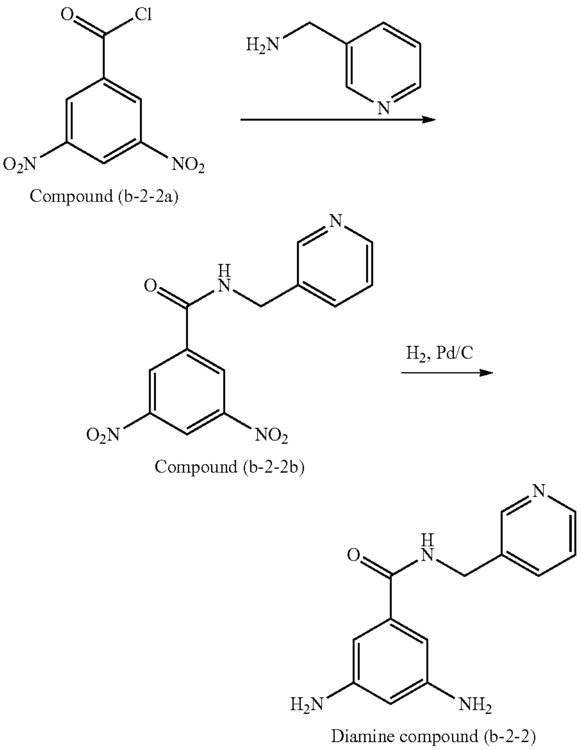

(1) Synthesis of Compound (b-2-2b)

300 g of a tetrahydrofuran solution containing 29.92 g (277 mmol) of 3-(aminomethyl)pyridine and 28.03 g (277 mmol) of triethylamine was cooled to 10° C. or less, and 150 g of a tetrahydrofuran solution containing 60.76 g (263 mmol) of 3,5-dinitro benzoyl chloride (compound (b-2-2a)) was added dropwise thereto while noting heat generation. After the dropwise addition was complete, the reaction temperature was raised to 23° C. and the reaction was continued. Next, after the completion of the reaction was confirmed with HPLC, the reaction solution was poured into 2 L of distilled water, and the precipitated solid was filtered. Then, after washing with water, the solid was washed with 450 g of ethanol through dispersion, thereby obtaining a compound (b-2-2b).

(2) Synthesis of Diamine Compound (b-2-2)

Under the existence of hydrogen gas, a mixture of 72.00 g (238 mmol) of the obtained compound (b-2-2b), 5% of palladium-carbon (aqueous type, 7.2 g, 10 wt %), and 720 g of 1,4-dioxane was stirred at 60° C. After the reaction was complete, the catalyst was filtered with celite and the solvent was distilled with an evaporator. Lastly, after washing with 360 g of ethanol by dispersion, a diamine compound (b-2-2) was obtained.

Preparation Example 3

The compound represented by formula (b-2-3) (diamine compound (b-2-3) hereinafter) was synthesized according to the following synthesis pathway 3.

Synthesis pathway 3

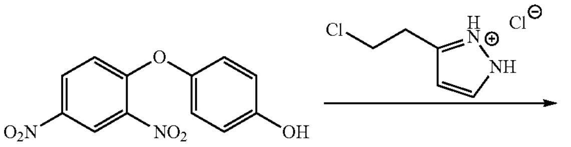

Compound (b-2-3a)

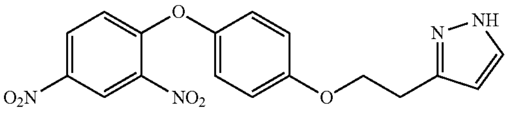

Compound (b-2-3b)

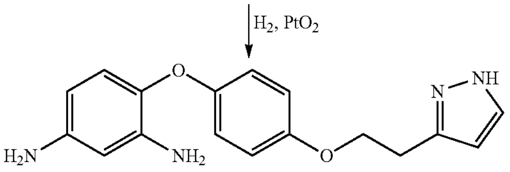

Diamine compound (b-2-3)

(1) Synthesis of Compound (b-2-3b)

In a nitrogen atmosphere, 340 g of a tetrahydrofuran solution containing 17.00 g (61.6 mmol) of 4-(2,4-dinitrophenoxyl)phenol (compound (b-2-3a)), 11.30 g (67.7 mmol) of 4-(2-chloroethyl)-1H-pyrazole hydrochloride, and 20.99 g (80.0 mmol) of triphenyl phosphine was cooled with an ice bath. Then, diethyl azotetracarboxylate) (40 wt % toluene solution, 34.84 mL, 80.0 mmol) was slowly added dropwise. After the dropwise addition was complete, the reaction temperature was slowly raised to 23° C. and the reaction was continued. Lastly, after the completion of the reaction was confirmed with HPLC, the solvent was distilled with an evaporator, and then 450 g of 2-propanol was used to perform recrystallization twice, thereby obtaining a compound (b-2-3b).

(2) Synthesis of Diamine Compound (b-2-3)

Under the existence of hydrogen gas, a mixture of 15.10 g (40.8 mmol) of the obtained compound (b-2-3b), platinum oxide (IV) ($PtO_2$, aqueous type, 1.5 g, 10 wt %), and 230 g of 1,4-dioxane was stirred at 23° C. After the reaction was complete, the catalyst was filtered with celite and the solvent was distilled with an evaporator. Lastly, 60 g of 2-propanol was used to perform recrystallization, thereby obtaining a compound (b-2-3).

Preparation Example 4

The compound represented by formula (b-2-4) (diamine compound (b-2-4) hereinafter) was synthesized according to the following synthesis pathway 4.

Synthesis pathway 4

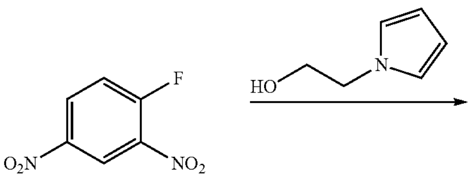

Compound (b-2-4a)

-continued

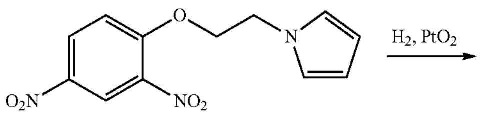

Compound (b-2-4b)

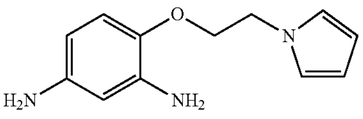

Diamine compound (b-2-4)

(1) Synthesis of Compound (b-2-4b)

60 g of a tetrahydrofuran solution containing 29.84 g (160 mmol) of 1-fluoro-2,4-dinitrobenzene (compound (b-2-4a)) was added dropwise to 240 g of a tetrahydrofuran solution containing 35.67 g (321 mmol) of 1-(2-hydroxyethyl)pyrrole and 97.39 g (932 mmol) of triethylamine. After the dropwise addition was complete and the completion of the reaction was confirmed with HPLC, 1 L of dichloromethane was added, and the mixture was washed with 600 mL of distilled water 3 times. Then, the organic layer was dried with anhydrous magnesium sulfate, filtered, and then the solvent was distilled by an evaporator. Lastly, a cosolvent of 500 g ethyl acetate/660 g n-hexane was used to perform recrystallization, thereby obtaining a compound (b-2-4b).

(2) Synthesis of Diamine Compound (b-2-4)

Under the existence of hydrogen gas, a mixture of 20.15 g (72.7 mmol) of the obtained compound (b-2-4b), platinum oxide (IV) ($PtO_2$, aqueous type, 2.0 g, 10 wt %), and 200 g (100/50 (v/v %)) of ethyl acetate/ethanol was stirred at 40° C. After the reaction was complete, the catalyst was filtered with celite and the solvent was distilled with an evaporator. Lastly, silica gel column chromatography was used to perform purification on mobile phase n-hexane/ethyl acetate (100/50 (v/v %)), thereby obtaining a diamine compound (b-2-4).

Preparation Example 5

The compound represented by formula (b-2-5) (diamine compound (b-2-5) hereinafter) was synthesized according to the following synthesis pathway 5.

Synthesis pathway 5

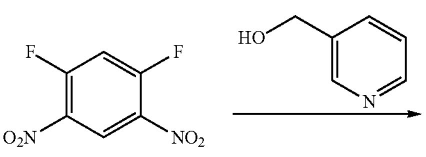

Compound (b-2-5a)

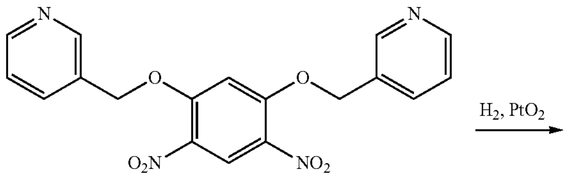

Compound (b-2-5b)

-continued

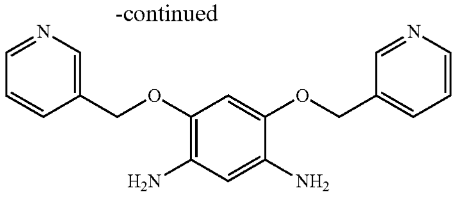

Diamine compound (b-2-5)

(1) Synthesis of Compound (b-2-5b)

In a nitrogen atmosphere, 21.39 g (196 mmol) of 3-(hydroxymethyl)pyridine was slowly added dropwise to 100 g of a tetrahydrofuran solution containing 10.00 g (49.0 mmol) of 1,5-difluoro-2,4-dinitrobenzene (compound (b-2-5a)) and 59.50 g (588 mmol) of triethylamine. After the reaction was complete, the reaction solution was poured into 1 L of distilled water, the precipitated solid was filtered and washed with water, and then a cosolvent of 200 g of acetonitrile/300 g of ethyl acetate was used to perform recrystallization, thereby obtaining a compound (b-2-5b).

(2) Synthesis of Diamine Compound (b-2-5)

Under the existence of hydrogen gas, a mixture of 8.00 g (20.1 mmol) of the obtained compound (b-2-5b), platinum oxide (IV) ($PtO_2$, aqueous type, 0.8 g, 10 wt %), and 80 g of 1,4-dioxane was stirred at 60° C. After the reaction was complete, the catalyst was filtered with celite and the solvent was distilled with an evaporator. Lastly, a cosolvent of 200 g tetrahydrofuran/600 g n-hexane was used to perform recrystallization, thereby obtaining a compound (b-2-5).

Preparation Example 6

The compound represented by formula (b-2-6) (diamine compound (b-2-6) hereinafter) was synthesized according to the following synthesis pathway 6.

Synthesis pathway 6

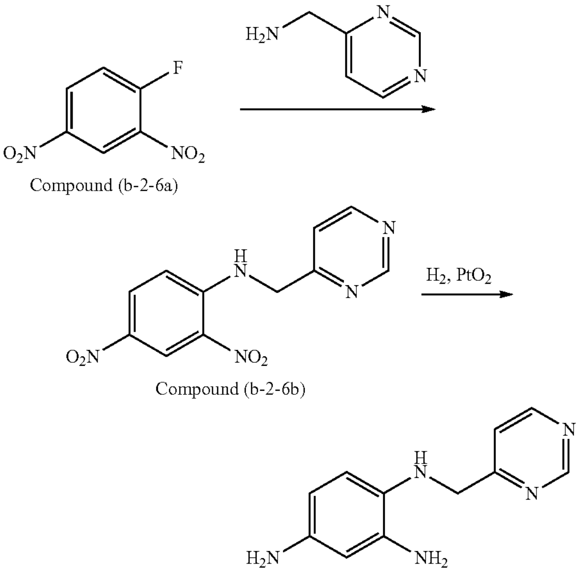

Compound (b-2-6a)

Compound (b-2-6b)

Diamine compound (b-2-6)

(1) Synthesis of Compound (b-2-6b)

830 g of an ethanol solution containing 43.00 g (231 mmol) of 1-fluoro-2,4-dinitrobenzene (compound (b-2-6a)) was added dropwise to a solution containing 30.23 g (277 mmol) of 4-(aminoethyl)pyrimidine, 29.12 g (347 mmol) of sodium bicarbonate, and 630 g of distilled water. After the dropwise addition was complete and the completion of the reaction was confirmed with HPLC, 2 L of dichloromethane was added and the aqueous layer was removed. Then, the organic layer was washed with 500 mL of saturated salt water 3 times, and the organic layer was dried with anhydrous magnesium sulfate. Lastly, the solvent was distilled with an evaporator, and a cosolvent of 500 g ethyl acetate/600 g n-hexane was used to perform recrystallization, thereby obtaining a diamine compound (b-2-6b).

(2) Synthesis of Diamine Compound (b-2-6)

Under the existence of hydrogen gas, a mixture of 3.0 g (10.9 mmol) of the obtained compound (b-2-6b), platinum oxide (IV) ($PtO_2$, aqueous type, 0.3 g, 10 wt %), and 30 g of 1,4-dioxane was stirred at 23° C. After the reaction was complete, the catalyst was filtered with celite and the solvent was distilled with an evaporator, thereby obtaining a diamine compound (b-2-6).

SYNTHESIS EXAMPLES OF POLYMER (A)

In the following, synthesis example A-1-1 to synthesis example A-1-5 of the polymer (A) are described:

Synthesis Example A-1-1

A nitrogen inlet, a stirrer, a condenser, and a thermometer were provided in a four-necked flask having a volume of 500 ml, and then nitrogen gas was introduced. Then, in a four-necked flask, 6.04 g (0.01 mol) of a diamine compound (b-1-1 hereinafter) represented by formula (1-10), 0.12 g (0.0005 mol) of the diamine compound (b-2-1 hereinafter) obtained in preparation example 1, 4.26 g (0.0395 mol) of p-diaminobezene (b-3-1 hereinafter), and 80 g of N-methyl-2-pyrrolidone (NMP hereinafter) were added, and the mixture was stirred at room temperature until the mixture was dissolved. Next, 9.8 g (0.05 mol) of 1,2,3,4-cyclobutane tetracarboxylic dianhydride (a-1 hereinafter) and 20 g of NMP were added, and the mixture was reacted at room temperature for 2 hours. After the reaction was complete, the reaction solution was poured into 1500 ml of water to precipitate a polymer. Then, the obtained polymer was filtered and was repeatedly washed with methanol and filtered three times. The polymer was then placed in a vacuum oven and dried at a temperature of 60° C., thereby obtaining a polymer (A-1-1).

Synthesis Example A-1-2 to Synthesis Example A-1-5

Polymer (A-1-2) to polymer (A-1-5) of synthesis example A-1-2 to synthesis example A-1-5 were respectively prepared with the same steps as synthesis example A-1-1, and the difference thereof is: the type and the usage amount of the monomers were changed (as shown in Table 1).

SYNTHESIS EXAMPLES OF POLYMER

In the following, synthesis example A-2-1 to synthesis example A-2-12 of the polymer are described:

Synthesis Example A-2-1

A nitrogen inlet, a stirrer, a condenser, and a thermometer were provided in a four-necked flask having a volume of 500 ml, and then nitrogen gas was introduced. Then, in a four-necked flask, 6.04 g (0.01 mol) of a diamine compound (b-1-1 hereinafter) represented by formula (1-10), 0.12 g (0.0005 mol) of the diamine compound (b-2-1 hereinafter) obtained in preparation example 1, 4.26 g (0.0395 mol) of p-diaminobezene (b-3-1 hereinafter), and 80 g of N-methyl-2-pyrrolidone (NMP hereinafter) were added, and the mixture was stirred at room temperature until the mixture was dissolved. Next, 9.8 g (0.05 mol) of 1,2,3,4-cyclobutane tetracarboxylic dianhydride (a-1 hereinafter) and 20 g of NMP were added. After the mixture was reacted at room temperature for 6 hours, 97 g of NMP, 2.55 g of acetic anhydride, and 19.75 g of pyridine were added. Then, the temperature was raised to 60° C., and the mixture was continuously stirred for 2 hours to perform an imidization reaction. After the reaction was complete, the reaction solution was poured into 1500 ml of water to precipitate a polymer. Then, the obtained polymer was filtered and was repeatedly washed with methanol and filtered three times. The polymer was then placed in a vacuum oven and dried at a temperature of 60° C., thereby obtaining a polymer (A-2-1).

Synthesis Example A-2-2 to Synthesis Example A-2-12

Polymer (A-2-2) to polymer (A-2-12) of synthesis example A-2-2 to synthesis example A-2-12 were respectively prepared with the same steps as synthesis example A-2-1, and the difference thereof is: the type and the usage amount of the monomers, the catalysts, and the dehydrating agents were changed (as shown in Table 2).

Comparative Synthesis Example A-3-1 to Comparative Synthesis Example A-3-3 of Polymer Polymer (A-3-1) to polymer (A-3-3) of comparative synthesis example A-3-1 to comparative synthesis example A-3-3 were respectively prepared with the same steps as synthesis example A-1-1, and the difference thereof is: the type and the usage amount of the monomers were changed (as shown in Table 3).

Comparative Synthesis Example A-3-4 to Comparative Synthesis Example A-3-6 of Polymer Polymer (A-3-4) to polymer (A-3-6) of comparative synthesis example A-3-4 to comparative synthesis example A-3-6 were respectively prepared with the same steps as synthesis example A-2-1, and the difference thereof is: the type and the usage amount of the monomers, the catalysts, and the dehydrating agents were changed (as shown in Table 3).

The compounds corresponding to the labels in Table 1, Table 2, and Table 3 are as shown below.

| Abbreviation | Component |
|---|---|
| a-1 | 1,2,3,4-cyclobutane tetracarboxylic dianhydride |
| a-2 | 2,3,5-tricarboxylic cyclopentyl acetic dianhydride |
| a-3 | 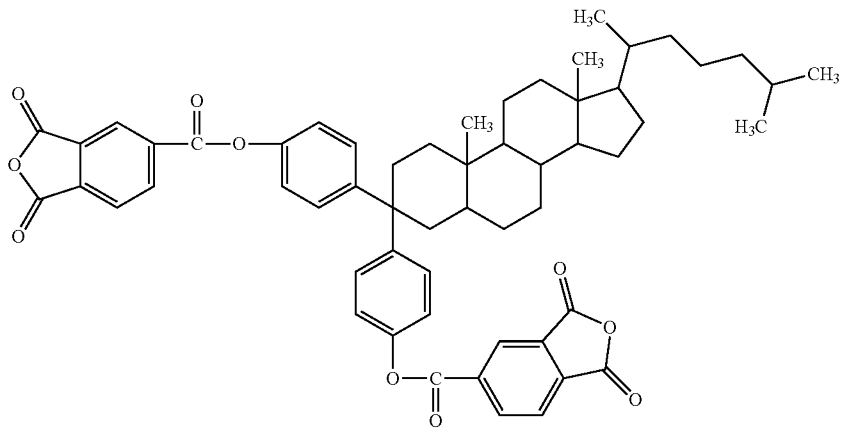 formula (I-3) |

-continued
| Abbreviation | Component |
|---|---|
| b-1-1 | 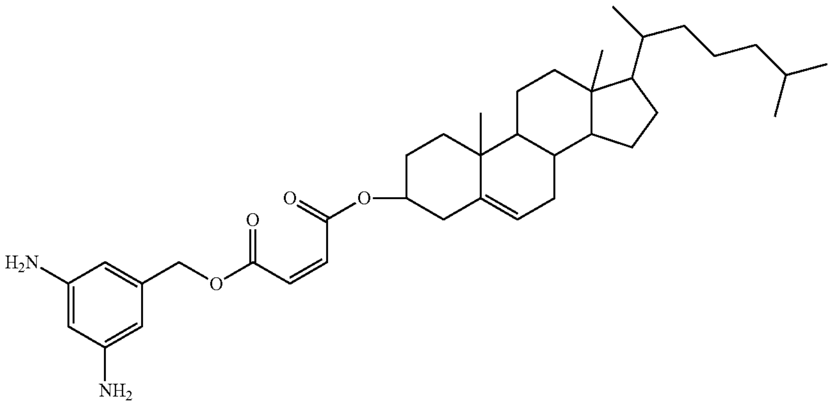 formula (1-10) |
| b-1-2 | 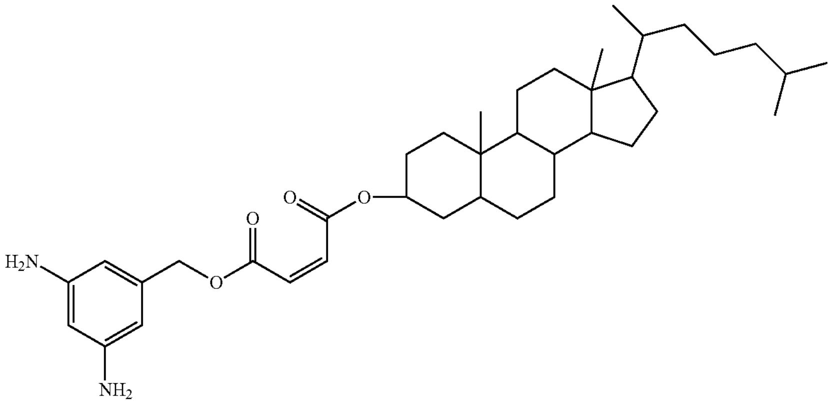 formula (1-7) |
| b-1-3 | 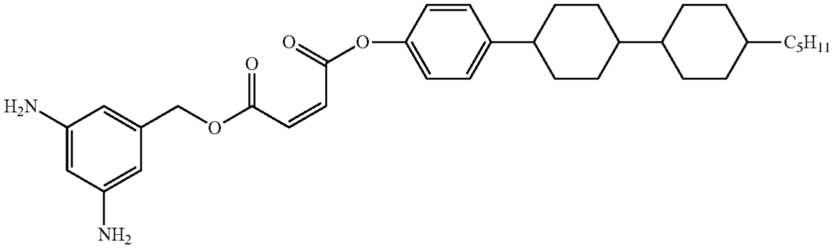 formula (1-18) |
| b-1-4 | 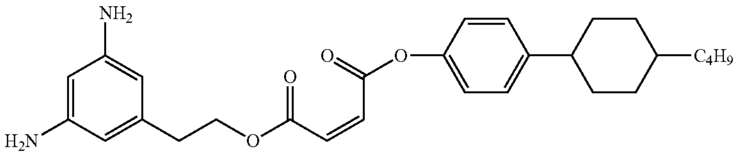 formula (1-15) |
| b-2-1 | Diamine compound (b-2-1) |
| b-2-2 | Diamine compound (b-2-2) |
| b-2-3 | Diamine compound (b-2-3) |
| b-2-4 | Diamine compound (b-2-4) |
| b-2-5 | Diamine compound (b-2-5) |
| b-2-6 | Diamine compound (b-2-6) |
| b-3-1 | p-diaminobezene |
| b-3-2 | 4,4'-diaminodiphenyl methane |
| b-3-3 | 4,4'-diaminodiphenyl ether |
| b-3-4 | 1-octadecoxy-2,4-diaminobenzene |

-continued
| Abbreviation | Component |
|---|---|
| b-3-5 | 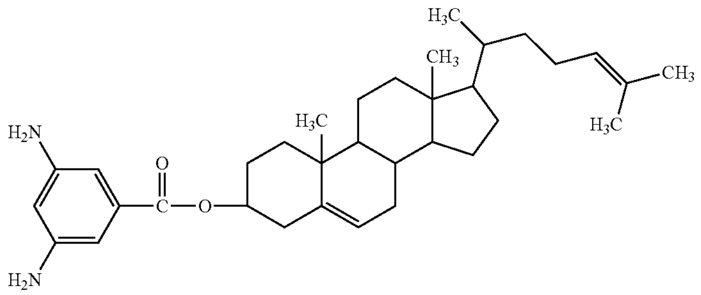<br>formula (II-1-4) |
| b-3-6 | 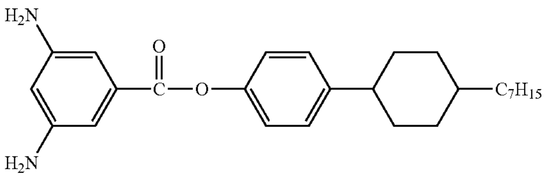 |
| b-3-7 | 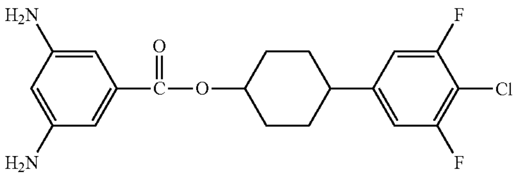<br>formula (II-2-7) |
| b-3-8 | 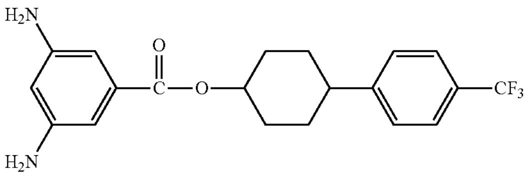<br>formula (II-2-8) |
TABLE 1
| Component (unit: mole %) | | | Synthesis example A-1-1 | A-1-2 | A-1-3 | A-1-4 | A-1-5 |
|---|---|---|---|---|---|---|---|
| Tetracarboxylic dianhydride component (a) | | a-1 | 100 | — | — | 100 | — |
| | | a-2 | — | 100 | — | — | 100 |
| | | a-3 | — | — | 100 | — | — |
| Diamine component (b) | Diamine compound (b-1) | b-1-1 | 20 | — | — | — | — |
| | | b-1-2 | — | 15 | — | — | — |
| | | b-1-3 | — | — | 25 | — | 10 |
| | | b-1-4 | — | — | — | 25 | 15 |
| | Diamine compound (b-2) | b-2-1 | 1 | — | — | — | — |
| | | b-2-2 | — | 20 | — | — | — |
| | | b-2-3 | — | — | 2 | — | — |
| | | b-2-4 | — | — | — | 5 | — |
| | | b-2-5 | — | — | — | — | 10 |
| | | b-2-6 | — | — | — | — | — |
| | Diamine compound (b-3) | b-3-1 | 79 | — | — | 62 | — |
| | | b-3-2 | — | 65 | — | — | 65 |
| | | b-3-3 | — | — | 60 | — | — |
| | | b-3-4 | — | — | 13 | — | — |
| | | b-3-5 | — | — | — | 8 | — |
| | | b-3-6 | — | — | — | — | 10 |

TABLE 1-continued

| Component (unit: mole %) | | | Synthesis example A-1-1 | A-1-2 | A-1-3 | A-1-4 | A-1-5 |
|---|---|---|---|---|---|---|---|
| | | b-3-7 | — | — | — | — | — |
| | | b-3-8 | — | — | — | — | — |
| (b-1)/(b-2) | | | 20.0 | 0.8 | 12.5 | 5.0 | 2.5 |
| Imidization ratio (%) | | | 0 | 0 | 0 | 0 | 0 |

TABLE 2

| Component (unit: mole %) | | | Synthesis example A-2-1 | A-2-2 | A-2-3 | A-2-4 | A-2-5 | A-2-6 | A-2-7 | A-2-8 | A-2-9 | A-2-10 | A-2-11 | A-2-12 |
|---|---|---|---|---|---|---|---|---|---|---|---|---|---|---|
| Tetracarboxylic dianhydride component (a) | | a-1 | 100 | — | — | 100 | — | — | 100 | — | — | — | 70 | 100 |
| | | a-2 | — | 100 | — | — | 100 | 100 | — | 50 | 100 | — | 30 | — |
| | | a-3 | — | — | 100 | — | — | — | — | 50 | — | 100 | — | — |
| Diamine component (b) | Diamine compound (b-1) | b-1-1 | 20 | — | — | — | — | — | — | — | — | — | 40 | — |
| | | b-1-2 | — | 15 | — | — | — | — | — | 10 | — | 20 | 10 | — |
| | | b-1-3 | — | — | 25 | — | 10 | 3 | 5 | — | — | 20 | — | 12 |
| | | b-1-4 | — | — | — | 25 | 15 | 3 | — | — | 30 | — | — | — |
| | Diamine compound (b-2) | b-2-1 | 1 | — | — | — | — | — | — | — | — | 4 | — | 6 |
| | | b-2-2 | — | 20 | — | — | — | — | — | — | — | — | — | 6 |
| | | b-2-3 | — | — | 2 | — | — | — | — | — | 3 | — | 15 | — |
| | | b-2-4 | — | — | — | 5 | — | — | 10 | — | 3 | — | — | — |
| | | b-2-5 | — | — | — | — | 10 | 15 | — | — | — | — | — | — |
| | | b-2-6 | — | — | — | — | — | — | — | 5 | — | — | — | — |
| | Diamine compound (b-3) | b-3-1 | 79 | — | — | 62 | — | — | 70 | 85 | — | 50 | — | — |
| | | b-3-2 | — | 65 | — | — | 55 | 59 | — | — | 4 | — | — | 40 |
| | | b-3-3 | — | — | 60 | — | — | — | — | — | 40 | — | — | 36 |
| | | b-3-4 | — | — | 13 | — | — | 20 | 15 | — | — | — | 20 | — |
| | | b-3-5 | — | — | — | 8 | — | — | — | — | — | — | — | — |
| | | b-3-6 | — | — | — | — | 10 | — | — | — | 20 | — | — | — |
| | | b-3-7 | — | — | — | — | — | — | — | — | — | 6 | — | — |
| | | b-3-8 | — | — | — | — | — | — | — | — | — | — | 15 | — |
| (b-1)/(b-2) | | | 20.0 | 0.8 | 12.5 | 5.0 | 2.5 | 0.4 | 0.5 | 2.0 | 5.0 | 10.0 | 3.3 | 1.0 |
| Imidization ratio (%) | | | 15 | 16 | 20 | 26 | 28 | 30 | 42 | 55 | 68 | 73 | 90 | 95 |

TABLE 3

| Component (unit: mole %) | | | Comparative synthesis example A-3-1 | A-3-2 | A-3-3 | A-3-4 | A-3-5 | A-3-6 |
|---|---|---|---|---|---|---|---|---|
| Tetracarboxylic dianhydride component (a) | | a-1 | 100 | — | — | 100 | 100 | — |
| | | a-2 | — | 100 | — | — | — | 100 |
| | | a-3 | — | — | 100 | — | — | — |
| Diamine component (b) | Diamine compound (b-1) | b-1-1 | — | — | — | — | — | — |
| | | b-1-2 | — | 15 | — | — | — | — |
| | | b-1-3 | — | — | — | — | — | — |
| | | b-1-4 | — | — | — | — | — | 30 |
| | Diamine compound (b-2) | b-2-1 | 1 | — | — | — | — | — |
| | | b-2-2 | — | — | — | — | — | — |
| | | b-2-3 | — | — | — | — | — | — |
| | | b-2-4 | — | — | — | — | 10 | — |
| | | b-2-5 | — | — | — | — | — | — |
| | | b-2-6 | — | — | — | — | — | — |
| | Diamine compound (b-3) | b-3-1 | 79 | — | — | 62 | 70 | — |
| | | b-3-2 | 20 | 65 | — | 30 | — | 10 |
| | | b-3-3 | — | 20 | — | — | — | 40 |
| | | b-3-4 | — | — | — | — | 15 | — |
| | | b-3-5 | — | — | 100 | 8 | — | — |
| | | b-3-6 | — | — | — | — | 5 | 20 |
| | | b-3-7 | — | — | — | — | — | — |
| | | b-3-8 | — | — | — | — | — | — |
| (b-1)/(b-2) | | | 0 | — | 0 | — | 0 | — |
| Imidization ratio (%) | | | 0 | 0 | 0 | 26 | 42 | 68 |

EXAMPLES AND COMPARATIVE EXAMPLES OF LIQUID CRYSTAL ALIGNMENT AGENT, LIQUID CRYSTAL ALIGNMENT FILM, AND LIQUID CRYSTAL DISPLAY ELEMENT

Example 1 to example 16 and comparative example 1 to comparative example 6 of the liquid crystal alignment agent, the liquid crystal alignment film, and the liquid crystal display element are described below:

Example 1 a. Liquid Crystal Alignment Agent 100 parts by weight of the polymer (A-1-1), 1200 parts by weight of N-methyl-2-pyrrolidone (B-1 hereinafter), and 600 parts by weight of ethylene glycol n-butyl ether (B-2 hereinafter) were weighed. Then, the components were stirred and mixed at room temperature to form the liquid crystal alignment agent of example 1.

b. Liquid Crystal Alignment Film and Liquid Crystal Display Element

The above liquid crystal alignment agent was respectively coated on two glass substrates having a conductive film formed by indium-tin-oxide (ITO) by a printing press (made by Nissha Printing Co., Ltd., model: S15-036) to form a pre-coat layer. Then, the glass substrates were placed on a heating plate and pre-bake was performed at a temperature of 100° C. for 5 minutes. Next, post-bake was performed in a circulation oven at a temperature of 220° C. for 30 minutes. Lastly, after alignment treatment, glass substrates on which the liquid crystal alignment film of example 1 was formed were obtained.

A hot press gel was coated on one of the two obtained glass substrates on which a liquid crystal alignment film was formed, and a 4 μm spacer was sprinkled on the other. Next, the two glass substrates were laminated, and a pressure of 10 kg was applied with a hot press machine to perform hot press lamination at a temperature of 150° C. Then, injection of liquid crystal was performed with a liquid crystal injection machine (made by Shimadzu Corporation, model: ALIS-100X-CH). Next, the injection hole of liquid crystal was sealed with an ultraviolet curing sealant, an ultraviolet lamp was used to cure the ultraviolet curing sealant by irradiation, and a liquid crystal annealing treatment was performed in an oven at a temperature of 60° C. for 30 minutes, thereby obtaining the liquid crystal display element of example 1.

The liquid crystal display element of example 1 was evaluated by each of the following evaluation methods, and the results thereof are as shown in Table 4.

Example 2 to Example 16

The liquid crystal alignment agent, the liquid crystal alignment film, and the liquid crystal display element of each of example 2 to example 16 were prepared by the same steps as example 1, and the difference thereof is: the type and the usage amount of the components were changed, as shown Table 4. The liquid crystal display element of each of examples 2 to 16 was evaluated with the evaluation methods below, and the results thereof are as shown in Table 4.

Comparative Example 1 to Comparative Example 6

The liquid crystal alignment agent, the liquid crystal alignment film, and the liquid crystal display element of each of comparative example 1 to comparative example 6 were prepared by the same steps as example 1, and the difference is: the type and the usage amount of the components were changed, as shown in Table 5. The liquid crystal display element of each of comparative example 1 to comparative example 6 was evaluated with the evaluation methods below, and the results thereof are as shown in Table 5.

The compounds corresponding to the labels in Table 4 and Table 5 are as shown below.

| Abbreviation | Component |
|---|---|
| A-1-1 | Polymer (A-1-1) |
| A-1-2 | Polymer (A-1-2) |
| A-1-3 | Polymer (A-1-3) |
| A-1-4 | Polymer (A-1-4) |
| A-1-5 | Polymer (A-1-5) |
| A-2-1 | Polymer (A-2-1) |
| A-2-2 | Polymer (A-2-2) |
| A-2-3 | Polymer (A-2-3) |
| A-2-4 | Polymer (A-2-4) |
| A-2-5 | Polymer (A-2-5) |
| A-2-6 | Polymer (A-2-6) |
| A-2-7 | Polymer (A-2-7) |
| A-2-8 | Polymer (A-2-8) |
| A-2-9 | Polymer (A-2-9) |
| A-2-10 | Polymer (A-2-10) |
| A-2-11 | Polymer (A-2-11) |
| A-2-12 | Polymer (A-2-12) |
| A-3-1 | Polymer (A-3-1) |
| A-3-2 | Polymer (A-3-2) |
| A-3-3 | Polymer (A-3-3) |
| A-3-4 | Polymer (A-3-4) |
| A-3-5 | Polymer (A-3-5) |
| A-3-6 | Polymer (A-3-6) |
| B-1 | N-methyl-2-pyrrolidone (NMP) |
| B-2 | ethylene glycol n-butyl ether |
| B-3 | N,N-dimethylacetamide |
| C-1 | N,N,N',N'-tetraglycidyl-4,4'-diaminodiphenyl methane |
| C-2 | N,N-glycidyl-p-glycidoxyaniline |

Evaluation Methods

Ultraviolet Reliability

The ultraviolet reliability of the liquid crystal alignment film was evaluated by the voltage holding ratio of the liquid crystal display element. More specifically, the measuring method of the voltage holding ratio of the liquid crystal display element is as described below.

The voltage holding ratio of the liquid crystal display element of each of example 1 to example 12 and comparative example 1 to comparative example 6 was respectively measured with an electrical measuring machine (made by Toyo Corporation, Model 6254). The test conditions include the application of a voltage of 4 V for 2 ms, release of the voltage, and measurement of the voltage holding ratio (calculated as VHR1) 1667 ms from release. Then, after the liquid crystal display element was irradiated with 4200 mJ/cm$^2$ of ultraviolet (model of ultraviolet irradiation machine: KN-SH48K1, made by Kuang Neng), the voltage holding ratio (calculated as VHR2) after ultraviolet irradiation was measured with the same test conditions. Lastly, percentage change of voltage holding ratio (calculated as $VHR^{UV}$ (%)) was obtained by calculating with formula (7). A lower percentage change of voltage holding ratio indicates better ultraviolet reliability.

$$VHR^{UV}(\%) = \frac{VHR1 - VHR2}{VHR1} \times 100\% \qquad \text{formula (7)}$$

The evaluation criteria of percentage change of voltage holding ratio are as shown below.

※: $VHR^{UV}<4\%$

◎: $4\%\leq VHR^{UV}<5\%$

○: $5\%\leq VHR^{UV}<10\%$

Δ: $10\%\leq VHR^{UV}<20\%$

X: $20\%\leq VHR^{UV}$

TABLE 4

| Component (unit: parts by weight) | | Example 1 | 2 | 3 | 4 | 5 | 6 | 7 | 8 |
|---|---|---|---|---|---|---|---|---|---|
| Polymer (A) | A-1-1 | 100 | — | — | — | — | — | — | — |
| | A-1-2 | — | 100 | — | — | — | — | — | — |
| | A-1-3 | — | — | 100 | — | — | — | — | — |
| | A-1-4 | — | — | — | 100 | — | — | — | — |
| | A-1-5 | — | — | — | — | 100 | — | — | — |
| | A-2-1 | — | — | — | — | — | 100 | — | — |
| | A-2-2 | — | — | — | — | — | — | 100 | — |
| | A-2-3 | — | — | — | — | — | — | — | 100 |
| | A-2-4 | — | — | — | — | — | — | — | — |
| | A-2-5 | — | — | — | — | — | — | — | — |
| | A-2-6 | — | — | — | — | — | — | — | — |
| | A-2-7 | — | — | — | — | — | — | — | — |
| | A-2-8 | — | — | — | — | — | — | — | — |
| | A-2-9 | — | — | — | — | — | — | — | — |
| | A-2-10 | — | — | — | — | — | — | — | — |
| | A-2-11 | — | — | — | — | — | — | — | — |
| | A-2-12 | — | — | — | — | — | — | — | — |
| | A-3-1 | — | — | — | — | — | — | — | — |
| | A-3-2 | — | — | — | — | — | — | — | — |
| | A-3-3 | — | — | — | — | — | — | — | — |
| | A-3-4 | — | — | — | — | — | — | — | — |
| | A-3-5 | — | — | — | — | — | — | — | — |
| | A-3-6 | — | — | — | — | — | — | — | — |
| Solvent (B) | B-1 | 1200 | — | 800 | 800 | 800 | — | — | 1000 |
| | B-2 | 600 | 1600 | — | — | — | 800 | 1500 | — |
| | B-3 | — | — | 1000 | 1000 | 1000 | 800 | 100 | 600 |
| Additive (C) | C-1 | — | — | 3 | — | — | — | — | — |
| | C-2 | — | — | — | — | — | — | — | — |
| Ultraviolet reliability | | ○ | ◎ | ○ | ◎ | ※ | ○ | ◎ | ○ |

| Component (unit: parts by weight) | | Example 9 | 10 | 11 | 12 | 13 | 14 | 15 | 16 |
|---|---|---|---|---|---|---|---|---|---|
| Polymer (A) | A-1-1 | — | — | — | — | — | — | — | — |
| | A-1-2 | — | — | — | — | — | — | — | — |
| | A-1-3 | — | — | — | — | — | — | — | — |
| | A-1-4 | — | — | — | — | — | — | — | — |
| | A-1-5 | — | — | — | — | — | — | — | — |
| | A-2-1 | — | — | — | — | — | — | — | — |
| | A-2-2 | — | — | — | — | — | — | — | — |
| | A-2-3 | — | — | — | — | — | — | — | — |
| | A-2-4 | 100 | — | — | — | — | — | — | — |
| | A-2-5 | — | 100 | — | — | — | — | — | — |
| | A-2-6 | — | — | 100 | — | — | — | — | — |
| | A-2-7 | — | — | — | 100 | — | — | — | — |
| | A-2-8 | — | — | — | — | 50 | — | — | — |
| | A-2-9 | — | — | — | — | 50 | — | — | — |
| | A-2-10 | — | — | — | — | — | 100 | — | — |
| | A-2-11 | — | — | — | — | — | — | 100 | — |
| | A-2-12 | — | — | — | — | — | — | — | 100 |
| | A-3-1 | — | — | — | — | — | — | — | — |
| | A-3-2 | — | — | — | — | — | — | — | — |
| | A-3-3 | — | — | — | — | — | — | — | — |
| | A-3-4 | — | — | — | — | — | — | — | — |
| | A-3-5 | — | — | — | — | — | — | — | |
| | A-3-6 | — | — | — | — | — | — | — | — |
| Solvent (B) | B-1 | 900 | 850 | 1400 | — | — | 800 | 800 | 800 |
| | B-2 | 300 | 850 | — | 1000 | — | 750 | 750 | 750 |
| | B-3 | 300 | — | — | 350 | 1500 | — | — | — |
| Additive (C) | C-1 | — | — | 1 | — | — | — | — | — |
| | C-2 | 5 | — | 2 | — | — | — | — | — |
| Ultraviolet reliability | | ◎ | ※ | ◎ | ◎ | ※ | ※ | ※ | ◎ |

TABLE 5

| Component (unit: parts by weight) | | Comparative example 1 | 2 | 3 | 4 | 5 | 6 |
|---|---|---|---|---|---|---|---|
| Polymer (A) | A-1-1 | — | — | — | — | — | — |
| | A-1-2 | — | — | — | — | — | — |
| | A-1-3 | — | — | — | — | — | — |
| | A-1-4 | — | — | — | — | — | — |
| | A-1-5 | — | — | — | — | — | — |
| | A-2-1 | — | — | — | — | — | — |
| | A-2-2 | — | — | — | — | — | — |
| | A-2-3 | — | — | — | — | — | — |
| | A-2-4 | — | — | — | — | — | — |
| | A-2-5 | — | — | — | — | — | — |
| | A-2-6 | — | — | — | — | — | — |
| | A-2-7 | — | — | — | — | — | — |
| | A-2-8 | — | — | — | — | — | — |
| | A-2-9 | — | — | — | — | — | — |
| | A-2-10 | — | — | — | — | — | — |
| | A-2-11 | — | — | — | — | — | — |
| | A-2-12 | — | — | — | — | — | — |
| | A-3-1 | 100 | — | — | — | — | — |
| | A-3-2 | — | 100 | — | — | — | — |
| | A-3-3 | — | — | 100 | — | — | — |
| | A-3-4 | — | — | — | 100 | — | — |
| | A-3-5 | — | — | — | — | 100 | — |
| | A-3-6 | — | — | — | — | — | 100 |
| Solvent (B) | B-1 | 1200 | — | 1000 | 850 | — | 740 |
| | B-2 | 600 | 1600 | — | 850 | 1000 | 830 |
| | B-3 | — | — | 600 | — | 350 | — |
| Additive (C) | C-1 | — | — | — | — | — | — |
| | C-2 | — | — | — | — | — | — |
| Ultraviolet reliability | | X | X | X | X | X | X |

<Evaluation Results>

It can be Known from Table 4 and Table 5 that, in Comparison to the Liquid crystal alignment films (example 1 to example 16) formed by the polymer (A) having both the diamine compound (b-1) and the diamine compound (b-2), the ultraviolet reliability of the liquid crystal alignment films (comparative examples 1, 3, 4, and 5) formed by the polymer (A) without the diamine compound (b-1) is poor, and the ultraviolet reliability of the liquid crystal alignment films (comparative examples 2, 3, 4, and 6) formed by the polymer (A) without the diamine compound (b-2) is poor.

Moreover, when the molar ratio (b-1)/(b-2) of the diamine compound (b-1) and the diamine compound (b-2) in the polymer (A) is 0.5 to 10, the ultraviolet reliability of the formed liquid crystal alignment films (examples 2, 4, 5, 7, 9, 10, and 12 to 16) is better.

Moreover, when the imidization ratio of the polymer (A) in the liquid crystal alignment agent is 30% to 90%, the ultraviolet reliability of the formed liquid crystal alignment films (examples 11 to 15) is better.

Moreover, when the polymer (A) in the liquid crystal alignment agent contains the diamine compound (b-3) of formula (II-2), the ultraviolet reliability of the formed liquid crystal alignment films (examples 5, 10, 13, 14, and 15) is better.

Based on the above, since the polymer in the liquid crystal alignment agent of the invention is formed by a tetracarboxylic dianhydride component and a diamine component containing a diamine compound having a specific structure, when the liquid crystal alignment agent is applied in a liquid crystal alignment film, the liquid crystal alignment film has better ultraviolet reliability. Therefore, the liquid crystal alignment agent is suitable for a liquid crystal display element.

Although the invention has been described with reference to the above embodiments, it will be apparent to one of the ordinary skill in the art that modifications to the described embodiments may be made without departing from the spirit of the invention. Accordingly, the scope of the invention is defined by the attached claims not by the above detailed descriptions.

What is claimed is:

1. A liquid crystal alignment agent, comprising:

a polymer (A); and a solvent (B), wherein the polymer (A) is obtained by reacting a mixture, and the mixture comprises a tetracarboxylic dianhydride component (a) and a diamine component (b), the diamine component (b) comprises a diamine compound (b-1) represented by formula (1) and a diamine compound (b-2) represented by formula (2), formula (1)

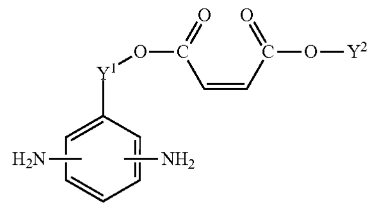

in formula (1), $Y^1$ represents a $C_1$ to $C_{12}$ alkylene group;

$Y^2$ represents a group having a steroid skeleton or a group represented by formula (1-1), formula (1-1)

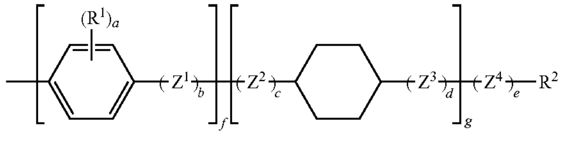

in formula (1-1), $R^1$ each independently represents a fluorine atom or a methyl group;

$R^2$ represents a hydrogen atom, a fluorine atom, a $C_1$ to $C_{12}$ alkyl group, a $C_1$ to $C_{12}$ fluoroalkyl group, a $C_1$ to $C_{12}$ alkoxy group, —$OCH_2F$, —$OCHF_2$, or —$OCF_3$;

$Z^1$, $Z^2$, and $Z^3$ each independently represent a single bond, a $C_1$ to $C_3$ alkylene group,

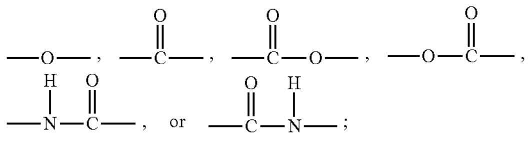

$Z^4$ each independently represents

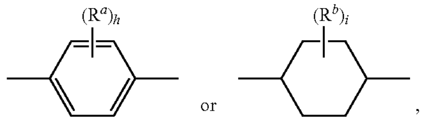

$R^a$ and $R^b$ each independently represent a fluorine atom or a methyl group, and h and i each independently represent 0, 1, or 2;

a represents 0, 1, or 2;

b, c, and d each independently represent an integer of 0 to 4;

e, f, and g each independently represent an integer of 0 to 3, and e+f+g≥1;

formula (2)

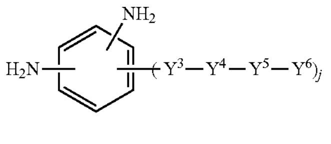

in formula (2), $Y^3$ each independently represents

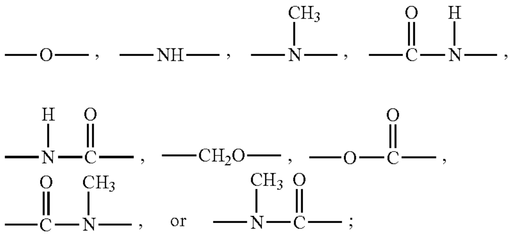

$Y^4$ each independently represents a single bond, a $C_1$ to $C_{20}$ divalent aliphatic hydrocarbon group, a divalent alicyclic hydrocarbon group, or a divalent aromatic hydrocarbon group;

$Y^5$ each independently represents a single bond,

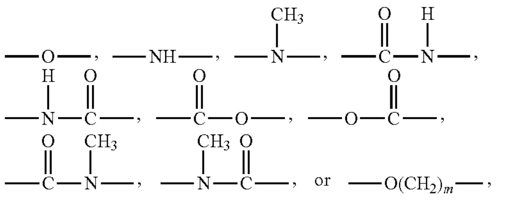

wherein m represents an integer of 1 to 5;

$Y^6$ each independently represents a nitrogen-containing aromatic heterocyclic group; and j represents an integer of 1 to 4, wherein $Y^4$ and $Y^5$ are not simultaneously single bonds.

2. The liquid crystal alignment agent of claim 1, wherein in formula (2), $Y^3$ each independently represents

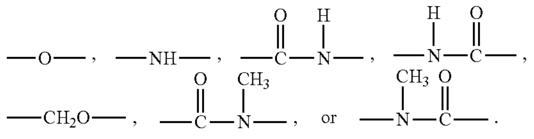

3. The liquid crystal alignment agent of claim 1, wherein in formula (2), $Y^4$ each independently represents a single bond, a $C_1$ to $C_5$ alkylene group, or a phenylene group.

4. The liquid crystal alignment agent of claim 1, wherein in formula (2), $Y^5$ each independently represents a single bond,

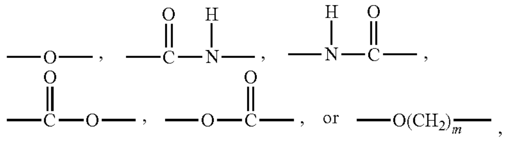

wherein m represents an integer of 1 to 5.

5. The liquid crystal alignment agent of claim 1, wherein in formula (2), $Y^6$ each independently represents a pyrrolyl group, an imidazolyl group, a pyrazolyl group, a pyridyl group, or a pyrimidinyl group.

6. The liquid crystal alignment agent of claim 1, wherein in formula (2), j represents an integer of 1 to 3.

7. The liquid crystal alignment agent of claim 1, wherein based on a usage amount of 100 moles of the diamine component (b), a usage amount of the diamine compound (b-1) represented by formula (1) is 5 moles to 50 moles, and a usage amount of the diamine compound (b-2) represented by formula (2) is 1 mole to 20 moles.

8. The liquid crystal alignment agent of claim 1, wherein a molar ratio (b-1)/(b-2) of the diamine compound (b-1) represented by formula (1) and the diamine compound (b-2) represented by formula (2) is 0.5 to 10.

9. The liquid crystal alignment agent of claim 1, wherein an imidization ratio of the polymer (A) is 30% to 90%.

10. A liquid crystal alignment film formed by the liquid crystal alignment agent of claim 1.

11. A liquid crystal display element, comprising the liquid crystal alignment film of claim 10.

* * * * *